US006789491B2

(12) United States Patent
Takahashi et al.

(10) Patent No.: US 6,789,491 B2
(45) Date of Patent: Sep. 14, 2004

(54) FRICTION REDUCING SHIP AND METHOD FOR REDUCING FRICTIONAL RESISTANCE

(75) Inventors: Yoshiaki Takahashi, Tokyo (JP); Yuichi Murai, Fukui (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 09/822,942

(22) Filed: Mar. 30, 2001

(65) Prior Publication Data

US 2002/0014192 A1 Feb. 7, 2002

(30) Foreign Application Priority Data

| | | |
|---|---|---|
| Apr. 3, 2000 | (JP) | 2000-101069 |
| May 31, 2000 | (JP) | 2000-163612 |
| Jun. 16, 2000 | (JP) | 2000-182283 |
| Jun. 22, 2000 | (JP) | 2000-188297 |
| Jul. 4, 2000 | (JP) | 2000-202844 |

(51) Int. Cl.$^7$ .......... B63B 1/34
(52) U.S. Cl. .......... 114/67 A
(58) Field of Search .......... 114/67 A

(56) References Cited

U.S. PATENT DOCUMENTS 3,875,885 A * 4/1975 Balquet et al. .......... 114/67 A
2001/0022152 A1 * 9/2001 Takahashi .......... 114/67 A
2003/0097971 A1 * 5/2003 Takahashi .......... 114/67 A

FOREIGN PATENT DOCUMENTS

| | | | |
|---|---|---|---|
| JP | HEI 03-243489 | | 10/1991 |
| JP | HEI 09-156575 | | 6/1997 |
| JP | 2001-55189 | * | 2/2001 |

* cited by examiner

*Primary Examiner*—Sherman Basinger
(74) *Attorney, Agent, or Firm*—Pearne & Gordon LLP

(57) ABSTRACT

A friction reducing ship reduces frictional resistance between the external hull plate 1 and water W by ejecting air A from the external hull plate 1 into water W to generate micro-bubbles B on the surface of the external hull plate 1. A structural feature of the ship is that micro-bubbles B are generated by creating a negative pressure region in the water W admitted in the water intake opening 2*a*, disposed below the waterline WL in the bow section 1*a*, so as to eject atmospheric air above the water into the water to generate micro-bubbles B, and discharging the micro-bubbles B together with water to the water discharge opening 2*b* provided in the bottom section 1*b*.

9 Claims, 20 Drawing Sheets

| FORCE COMPONENTS | FACTORS PROPORTIONAL TO THE MAGNITUDE OF FORCES |
|---|---|
| RESISTANCE(VISCOSITY) | SQUARE OF VELOCITY, AREA |
| PRESSURE GRADIENT FORCE | AREA |
| LIFT FORCE | VORTICITY, VELOCITY |
| LEVITATION FORCE | VOLUME |
| VOLUME CHANGE FORCE | VOLUME |
| ADDITIONAL MOMENTUM | ACCELERATION |
| SURFACE TENSION | RADIUS RAISED TO THE POWER OF -1 |

FRICTION REDUCING SHIP AND METHOD FOR REDUCING FRICTIONAL RESISTANCE

FIELD OF THE INVENTION

This invention relates to a technology of reducing the frictional resistance of a ship by ejecting bubbles on a submerged surface of a ship.

BACKGROUND TECHNOLOGY

A technology relating to the friction reducing ship noted above is disclosed in Japanese Patent Applications, First Publication, Sho 50-83992, Sho 53-136289, Sho 60-139586, Sho 61-71290, and in Practical Utility Models, Sho 61-39691 and Sho 61-128185. The friction reducing ship achieves reduction in frictional resistance by introducing numerous micro-bubbles at the surface of the outer hull plate of a ship by jetting into the water a gaseous substance such as air from the ship outer hull plate of a cruising ship, and reducing the frictional resistance existing between the water and the hull plate by the presence of the micro-bubbles. Such reduction in the frictional resistance enables to reduce the motive power required for the cruising ship (fuel saving), and ultimately reduce the cost of operating the ship.

This applicant has been proposing a technology for reducing the frictional resistance of a ship based on enveloping a wide area of the ship's bottom section by jetting air near the bow of the ship from the lateral hull of the ship, which is subjected to lesser static pressure than the bottom hull surface, to generate micro-bubbles and transporting the micro-bubbles along the flowlines to the bottom hull surface. This technology is based on an observation that the flowlines in the vicinity of the ship's bow swirl from the lateral hull of the ship to the bottom surface of the ship, so that, by jetting a gaseous substance from the lateral hull surface, where the static pressure is less than that at the bottom surface, power required to eject the gas into the water is reduced, thereby controlling the loss of saving the fuel that can be achieved through reducing the frictional resistance.

However, in the conventional technology according to the applicant of this invention, although it was possible to envelope a wide area of the bottom section with micro-bubbles, it was insufficient. That is, there is a problem that although flowlines on the port side and starboard side starting at the bow of the ship do swirl around to the bottom surface from the respective port or starboard side to disperse the micro-bubbles, they are only effective in covering the port and starboard regions of the bottom surface, and are not effective in extending the flow of micro-bubbles to the center section of the bottom surface.

Also, according to the conventional technology, various methods for generating bubbles in the water rely on equipment such as pumps and blowers to pressure the gas, which is then ejected into the water through a plurality of holes provided on the hull or porous plates. However, the method based on ejecting the pressurized gas into the water presents a problem that energy is expended in operating the pressurizing equipment so that it results in a loss of part of the energy saving achieved by reducing the frictional resistance. Especially, if the gas is ejected into the water from relatively deep locations below the surface such as at the bottom surface of large capacity vessels, it is necessary to apply higher pressure in relation to the water pressure (static pressure), thus resulting in expending a large amount of energy. Also, the high cost of pressurizing equipment and facility installation cost must also be considered.

Further, according to the conventional technology, the structure for introducing the gas from the gaseous space into the water is generally achieved by providing a network of piping and ducting throughout the interior of the ship from the equipment to the discharge end. However, the friction reducing ship described above is based on piping networks in the ship interior, the facility must be installed while avoiding interference with other equipment, so that the construction cost tends to be high because of problems such as labor-intensive construction tasks and a large number of parts required for the structure.

DISCLOSURE OF THE INVENTION

This invention is provided in view of the background information presented above, and the objectives of the invention are as follows.

(a) To reduce the motive power required for generating the micro-bubbles.

(b) To envelope a wider bottom surface of a ship with micro-bubbles.

(c) To further improve fuel saving brought about by reducing the frictional resistance.

(d) Use lesser amount of energy in lowering the frictional resistance to lead to reduced energy consumption for cruising.

(e) To mix the bubbles in the water efficiently to achieve effective reduction in frictional resistance.

(f) To reduce the cost of constructing the ship.

To achieve such objects, this invention adopts as the most comprehensive means a friction reducing ship that reduces frictional resistance by ejecting gas bubbles on a submerged surface of a ship body, and adopts as a method for reducing frictional resistance, a means provided by a ship body cruising through a body of water for creating in the water a negative pressure region having a pressure lower than a pressure in a gaseous space, and directing a gas from the gaseous space to the negative pressure region in the water to generate the gas bubbles on the submerged surface.

According to such a structure, no special motive force is required and using a very simple means, it is possible to supply a gas from a gaseous space to the negative pressure region to generate bubble on the submerged surface. Therefore, according to this invention, each of the above objects is achieved.

Also, to achieve the objects in this invention, in a friction reducing ship that reduces frictional resistance by ejecting gas bubbles on a submerged surface of a ship body, a structure is adopted to comprise a bubble generation apparatus for generating micro-bubbles by creating a negative pressure state in a portion of water admitted from a water intake opening provided below a waterline in a bow section of the ship body so as to eject atmospheric air into water and discharging the micro-bubbles together with the water to a water discharge opening provided in a bottom section of the ship.

Also, in a friction reducing ship that reduces frictional resistance by ejecting gas bubbles on a submerged surface of a ship body, a structure is adopted to comprise: a water transport passage provided on an external hull plate so as to extend from a water intake opening provided below a waterline in a bow section to a water discharge opening provided in a bottom section, and having an air discharge opening disposed partway along the passage; an air transport passage extending from above the water to the air discharge opening; and a gas ejection member protruding toward an inner side of the water transport passage and provided in such a way to cover the air discharge opening having a gas ejection opening; wherein the air discharge opening is situated in a location such that a hydrostatic pressure at the air discharge opening is negative with respect to an atmospheric pressure existing above the water.

Furthermore, a method is adopted for reducing frictional resistance of a ship body by creating a negative pressure state in a portion of water admitted from a water intake opening provided in a bow section of the ship body below a waterline so as to generate micro-bubbles of by ejecting atmospheric air into the water and discharging the micro-bubbles together with the water to a water discharge opening provided in a bottom section of the ship.

According to such a friction reducing ship or a method for reducing frictional resistance, a negative pressure region is created in the water admitted from the bow section of the ship so as to discharge the air above the water to the water discharge opening in the bottom section, so that it is possible to generate micro-bubbles in the water without using additional motive power such as compressor for ejecting air into the water. Also, the water intake opening is provided in the bow section and the water discharge opening is provided in the bottom section, by having the ship cruise through a body of water, the water can easily be admitted from the water intake opening and discharged through the water discharge opening. Therefore, micro-bubbles can be generated while suppressing generation of resistance relating to water intake action. Also, because the water discharge opening is located in the bottom section, it is possible to envelope the bottom section effectively with micro-bubbles to reduce frictional resistance effectively, and therefore, to realize improvement in fuel saving due to reduced frictional resistance. Further, the water passage, air passage and the gas ejection member are provided, and the air ejection opening is located in such a way that the hydrostatic pressure is negative with respect to the atmospheric pressure, and therefore, it is possible to generate micro-bubbles within the water using a very simple structure and without using additional motive power such as a compressor. Therefore, this aspect of the invention is also effective in reducing the frictional resistance.

To achieve the objects listed above, a method is adopted for reducing frictional resistance of a ship by ejecting gas bubbles on a submerged surface of a ship body by creating in the water a negative pressure region, having a pressure lower than a pressure in a gaseous space, resulting from the ship body cruising through a body of water, and directing a gas from the gaseous space to the negative pressure region in the water and forming a flow of water having locally severe vortices.

Also, a structure is adopted such that, in a friction reducing ship that reduces frictional resistance by ejecting gas bubbles on a submerged surface of a ship body, a structure comprises: a negative pressure forming section for creating a negative pressure region in water having a lower pressure relative to a gaseous space; a fluid guiding passage for directing a gas from the gaseous space to the negative pressure region; and a detaching promotion section for forming a water flow having locally severe vortices.

The basic principle of this invention will be explained in the following.

In general, when a pressure gradient is formed in a fluid environment, the fluid body is subjected to a pressure gradient force acting in the direction of a higher pressure side to a lower pressure side to induce the fluid to flow. Therefore, by creating a negative pressure region in the water with respect to a pressure in a gaseous space, it becomes possible to send the gas in the gaseous space to the negative pressure region in the water to a certain depth using the pressure gradient force.

FIG. 4 shows a schematic diagram of a friction reducing ship having a negative pressure forming section for creating a negative pressure region in the water. When the ship 1 is moving at a given cruising speed Vs, a water stream 2 relative to the ship is formed. If the water path is narrowed by the negative pressure forming section 3, for example, the velocity of water stream 2 increases, and the hydrostatic pressure Pwa decreases locally (Bernoulli's principle). Designating the water flow velocity by Vwa, pressure in the gaseous space (atmospheric pressure) by Pa, water density by ρ, gravitational acceleration by g, and water depth by Hwa, the hydrostatic pressure Pwa is given by the following expression:

$$Pwa=Pa+\rho\cdot g\cdot Hwa-\rho\cdot(Vwa^2-Vs^2)/2 \quad (1)$$

As can be seen clearly from equation (1), when the water flow velocity Vwa satisfies the next equation, a negative pressure region 4 having a lower pressure relative to the atmospheric pressure is formed as shown in equation (2).

$$\rho\cdot g\cdot Hwa-(Vwa^2-Vs^2)/2<0 \quad (2)$$

When the negative pressure region 4 is formed in the water, the pressure gradient force described above causes the gas to flow inside a fluid passage 5 and is sent into the water. When the gas is sent into the water by forming the negative pressure region 4 (negative pressure method), because there is no need to pressurize the gas, the amount of energy expended in sending the bubbles into the water is less compared with the conventional pressure method. Also, by sending the gas sent into the water as bubbles 6 to mix with the water, numerous bubbles 6 can be located on the submerged surface of the ship body 1, and numerous bubbles 6 are allowed to intervene between the ship body 1 and the submerged surface to reduce the frictional resistance acting on the ship.

However, the bubbles 6 in the water are acted on by many forces. An example of such forces is shown in Table 1 in FIG. 5. For example, as shown in FIG. 4, it is considered that, when the negative pressure forming section 3 is protruding from the bottom section of the ship, the gas flowing inside the fluid passage 5 reaches an interface 7 (gas/liquid interface) between the gas and the liquid (water), and then bubbles 6 transfer into the water as a result of the pressure gradient force exerted by the negative pressure region 4 as well as the lift force, which will be explained later, and then flows by floating in the flow of the water. The lift force is generated when the water stream 2 around the bubbles 6 has eddy current, and the direction of the force is opposite to a vector obtained by a product of a vorticity vector of liquid ω and a relative velocity vector us. The magnitude is proportional to a bubble volume Av and a liquid density ρ. That is, the lift force Lf is expressed by the following equation (3).

$$Lf=-\rho\cdot Av(us\cdot\omega) \quad (3)$$

However, the lift force Lf is Auton's momentum lift force. When the Reynold's number is low, Staffman lift force operates so that it is proportional to the vortex raised to the power of ½. Here, the direction of action is the same in both cases.

In the boundary layer at the bottom section, streams having vortices are found near the surface of the outer hull plate in general, so that each vector is directed in the direction shown in FIG. 6. As can be understood from FIG.

6, the lift force Lf at the bottom section acts in a direction away from the outer hull plate, that is, in the direction of detaching the bubbles 6 from the gas/liquid interface 7 into the water.

However, depending on the shape of the negative pressure forming section, a relatively large force (resistance force) can sometimes act on the bubbles to force them to return to the gas/liquid interface. For example, when the water flows along the negative pressure forming section 3 shown in FIG. 4, the resistance force on the bubbles 6 is the additional momentum force and the pressure gradient force which will be explained next. The additional momentum force is the momentum force due to the added mass of a bubble placed in the liquid (water), and if the density difference between the gas and liquid is assumed to be 1/800, compared with the momentum force acting on the mass of gas itself residing inside the bubble, it is 400 times larger. Also, compared with the momentum force of water, bubble momentum force+ additional momentum force is ½ as large. From this, for a given external force, a bubble will generate three times the acceleration of water, (1+1/(½)=3), assuming the maximum value by neglecting the resistance force.

That is, as shown in FIG. 7, when the bubbles 6 and the water flow along a curved surface of a solid body 8, when the flow direction of water stream 2 changes downward at a 凹-shaped section PA1, the bubbles 6 descends at three times the acceleration of water. Also, when the flow direction of water stream 2 changes upward at a 凸-shaped section PA2, the bubbles 6 ascends at six time the acceleration of water. Therefore, when the water flows along the negative pressure forming section 3 in FIG. 4, because of the curvature of the apex section of the negative pressure forming section 3 (凸-shaped section), as the stream 2 changes the flow direction to upward direction at the negative pressure forming section 3, additional momentum force operates to push the bubble back to the gas/liquid interface 7.

Also, in the case shown in FIG. 4, because the pressure at the negative pressure region 4 is lower compared with other regions in the water, the bubbles 6 residing in the negative pressure region 4 is acted by the pressure gradient force to push it back to the gas/liquid interface 7. Then, when a large force (resistance force) to push to the gas/liquid interface acts on the bubble, the bubble becomes more difficult to be detached from the gas/liquid interface so that the lesser amount of bubbles are mixed in the water, and there is a danger that the frictional resistance may not be reduced effectively.

Therefore, the flow of water is formed so as to facilitate the movement of the bubbles from the gas/liquid interface into water so as to decrease the resistance force acting against detachment of the bubbles, the bubbles are facilitated to leave the gas/liquid interface to increase the amount of bubbles mixed in the water. That is, by forming the flow so as to generate high degree of local vortices, the lift force acts on the bubbles in the direction of detachment to promote detachment of bubbles from the gas/liquid interface.

According to the method of reducing frictional resistance based on the principle outlined above, by forming negative pressure regions in the water, reduction of frictional resistance can be carried out utilizing the pressure gradient force, with a lesser amount of energy to send the air into water, compared with the case of compressing the air. It follows that effective friction resistance reduction is achieved to reduce the energy consumption during cruising.

Also, according to the friction reducing ship of this invention, by having the negative pressure forming section to form a negative pressure region in the water, reduction of frictional resistance can be carried out utilizing the pressure gradient force, with a lesser amount of energy to send the air into water, compared with the case of compressing the air. Also, using the flow formed by the detaching promotion section, detaching of bubbles from the gas/liquid interface is promoted by utilizing the lift force to increase the amount of bubbles mixed in the water. It follows that effective reduction in frictional resistance is achieved to reduce the energy consumption during cruising. Further, equipment for pressurizing the air becomes unnecessary so that the cost of building the ship can be lowered.

Further, to achieve the objects (d)~(f), in a friction reducing ship that reduces frictional resistance by ejecting gas bubbles on a submerged surface of a ship body, a structure is adopted to comprise: a negative pressure forming section protruding from the submerged surface for creating a negative pressure region in water relative to a gaseous space; a discharge opening for ejecting gas bubbles towards the negative pressure region in water; a fluid passage having one end open to the gaseous space and having other end open in water by way of the discharge opening so as to direct a gas from the gaseous space into water; wherein the discharge opening is disposed on an inclined surface inclined at an angle to the submerged surface of the ship body.

According to such a friction reducing ship, because a negative pressure region that has a pressure lower than the gaseous space is formed by the negative pressure forming section, the gas is directed into the water through the fluid passage by utilizing the pressure gradient force, and the bubbles are discharged into water from the water discharge opening. Because the water discharge opening is disposed in the inclined surface inclined at an angle to the submerged surface of the ship body, the area of the discharge opening can be enlarged readily within a given region of the submerged surface. Further, because the inclined surface is disposed in a depression provided on a submerged surface of a ship body to extend from an inner location to an outer location of the depression, by having at least a portion of the discharge opening within the depression, the height of protrusion of the inclined surface from the submerged surface of the ship body can be controlled even when a large area is provided for the discharge opening. Therefore, a large amount of bubbles can be ejected from the discharge opening of a large opening area while suppressing any increase in the resistance force against the flow of water.

As a result, it is possible to reduce the frictional resistance of a ship using a lesser amount of energy by sending the gas into the water by utilizing the pressure gradient force compared with the case of pressurizing the air. Also, because the discharge opening for ejecting bubbles is disposed on an inclined surface disposed at an angle to the submerged surface of the ship body and the inclined surface is provided to extend from the inside of the depression disposed on the submerged surface to external section, a large amount of bubbles can be ejected from the discharge opening of a large opening area while suppressing any increase in the resistance force against the flow of water. Therefore, using a large amount of bubbles to achieve an effective reduction in frictional resistance to reduce energy consumption for cruising operation. Also, apparatus for pressurizing the gas is not necessary so that the cost of building the ship can be readily reduced.

Further, to achieve the objects (d) and (e) in this invention, in a friction reducing ship that reduces frictional resistance by ejecting gas bubbles on a submerged surface of a ship body, a structure is adopted to comprise: a negative pressure forming section protruding from the submerged surface for creating a negative pressure region in water relative to a gaseous space; a discharge opening disposed in a rear of the negative pressure forming section for ejecting gas bubbles towards the negative pressure region in water; a fluid passage having one end open to the gaseous space and having other end open in water by way of the discharge opening so as to direct a gas from the gaseous space into water; and a gas supply apparatus for supplying a gas towards the negative pressure region.

Also a method for reducing frictional resistance by ejecting gas bubbles on a submerged surface of a ship body by creating in the water a negative pressure region, having a pressure lower than a pressure in a gaseous space, resulting from the ship body cruising through a body of water, and directing a gas from the gaseous space to the negative pressure region in the water so as to eject bubbles into a body of water, and supplying a gas to the negative pressure region by using a specific apparatus.

According to such a friction reducing ship or a method for reducing frictional resistance of a ship, because a negative pressure region that has a pressure lower than the gaseous space is formed by the negative pressure forming section, the gas is directed into the water through the fluid passage by utilizing the pressure gradient force. Also, by using the gas supply apparatus to supply a gas into the fluid passage, the amount of gas flowing in the fluid passage is increased, and a large amount of bubbles are ejected from the discharge opening. A result is that, by disposing a portion of the negative pressure forming section to protrude from the submerged surface of the ship body, it is possible to reduce the frictional resistance of a ship using a lesser amount of energy by sending the gas into the water by utilizing the pressure gradient force compared with the case of pressurizing the air. Also, by supply the gas from the gas supply apparatus, the volume of gas flowing in the fluid passage can be increased with a small amount of energy so as to discharge a large amount of bubbles from the discharge opening. Therefore, effective reduction in frictional resistance is achieved using a large amount of bubbles to reduce the energy consumption during cursing operation.

Also, to achieve the objects (d)~(f) in this invention, a method is adopted for reducing frictional resistance by ejecting gas bubbles on a submerged surface of a ship body by creating in the water a negative pressure region, having a pressure lower than a pressure in a gaseous space, resulting from the ship body cruising through a body of water, and directing a gas from the gaseous space to the negative pressure region in the water, and generating a circulating flow of water by using a wing to expand the negative pressure region.

In a friction reducing ship that reduces frictional resistance by ejecting gas bubbles on a submerged surface of a ship body, a structure is adopted to comprise: a negative pressure forming section protruding from the submerged surface for creating a negative pressure region in water relative to a gaseous space; a discharge opening disposed in a rear of the negative pressure forming section for ejecting gas bubbles towards the negative pressure region in water; a fluid passage having one end open to the gaseous space and having other end open in water by way of the discharge opening so as to direct a gas from the gaseous space into water; wherein the negative pressure forming section is provided with a wing shaped component whose cross sectional shape is formed in a wing shape.

According to such a friction reducing ship or a method for reducing frictional resistance of a ship, because a negative pressure region that has a pressure lower than the gaseous space is formed by the negative pressure forming section, the gas is directed into the water through the fluid passage by utilizing the pressure gradient force. In this case, by developing the negative pressure region by creating a circulating flow in the water due to the wing, the pressure gradient force is increased to direct a large amount of bubbles into the water. Also, by applying an uplifting force on the ship body due to the circulating flow, it is possible to reduce the area of the submerged surface of the ship body. A result is that, by disposing a portion of the negative pressure forming section to protrude from the submerged surface of the ship body, it is possible to reduce the frictional resistance of a ship using a lesser amount of energy by sending the gas into the water by utilizing the pressure gradient force compared with the case of pressurizing the air. Also, by developing the negative pressure region in the water due to the circulating flow caused by the wing, it is possible to increase the amount of bubbles mixed in the water. Further, by applying an uplifting force on the ship body due to the circulating flow, it is possible to reduce the area of the submerged surface of the ship body. effective reduction in frictional resistance is achieved using a large amount of bubbles to reduce the energy consumption during cursing operation.

Further, to achieve the object (f) in this invention, in a friction reducing ship that reduces frictional force by ejecting gas bubbles on a submerged surface of a ship body, a structure is adopted to comprise: a discharge opening disposed on the submerged surface for ejecting gas bubbles into water; a fluid passage having one end open to the gaseous space and having other end open in water by way of the discharge opening so as to direct a gas from the gaseous space into water; wherein at least a portion of the fluid passage is comprised by component members to form outer shell of the ship body.

According to such a friction reducing ship, because the fluid passage is constructed of the member comprising the outer shell plate of the ship body, there is no need to install new piping for directing a gas into the water, thus enabling to reduce the cost of building the ship by reducing the number of members and labor cost. Also, the ducts that form the fluid passage are reinforcing members of the ship body, and therefore, a high degree of design freedom is possible such as providing many ducts on the ship body and disposing the ducts wherever needed. Furthermore, by forming the fluid passage in a divided manner, a plurality of fluid passages may be made available for selection.

SIMPLE EXPLANATION OF THE DRAWINGS

Figure 1:
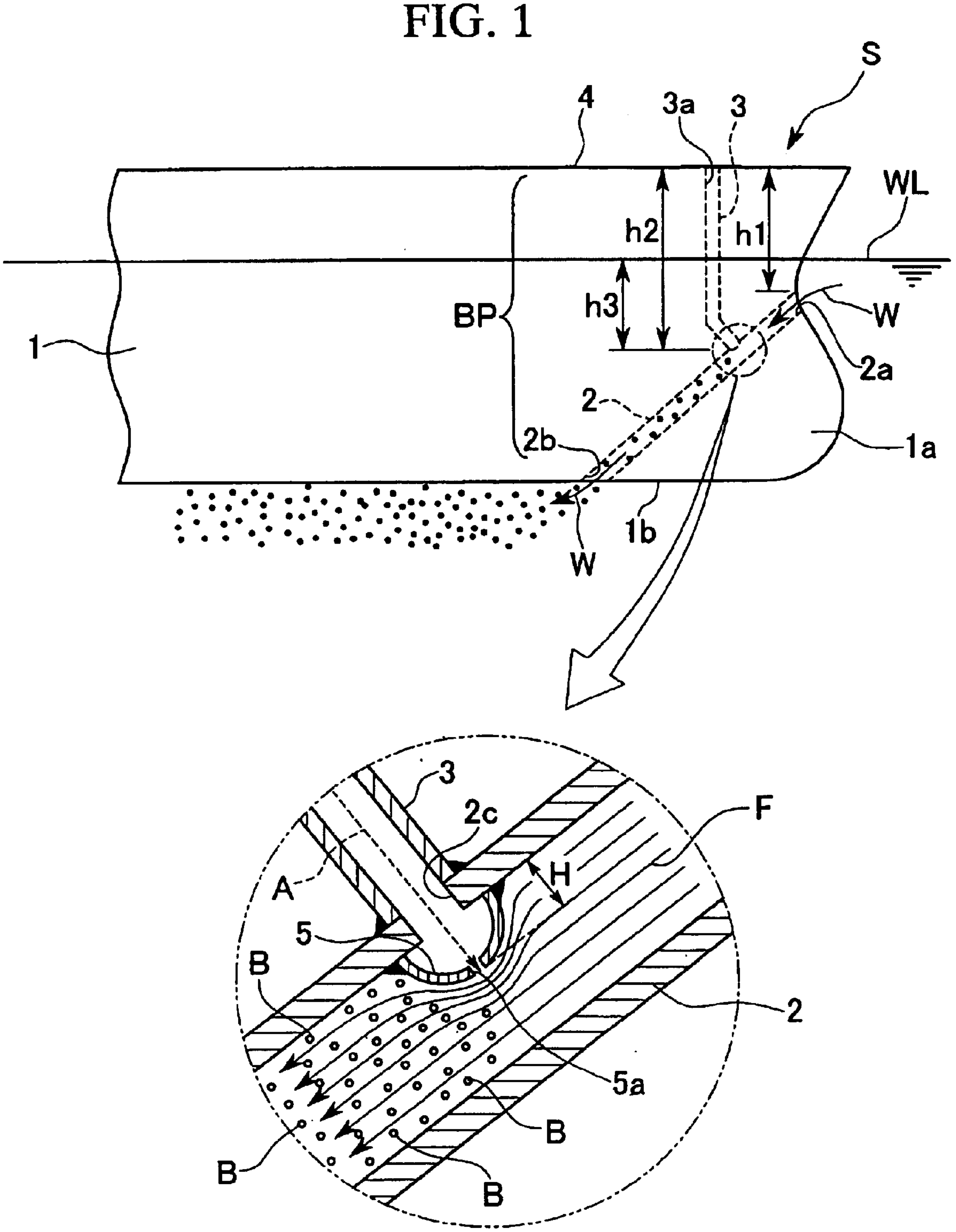
FIG. 1 is a side view and an enlarged cross sectional view of the key sections of a friction reducing ship in a first embodiment of this invention.

In the diagrams presented above, same reference numerals are used repeatedly through Embodiments 1~6. However, such duplicity of reference numerals do not bear any relationship to those used in various embodiments. For example, some of the reference numerals used in FIGS. 1, 2, 3A, and 3B to explain the aspects of the first embodiment are used in other embodiments, but such duplicity of reference numerals do not bear any relation to the same reference numerals used in other embodiments.

PREFERRED EMBODIMENTS OF THE INVENTION

A: Embodiment 1

In the following, Embodiment 1 of this invention for a friction reducing ship and a method of reducing the frictional forces will be explained with reference to the drawings.

Figure 2:
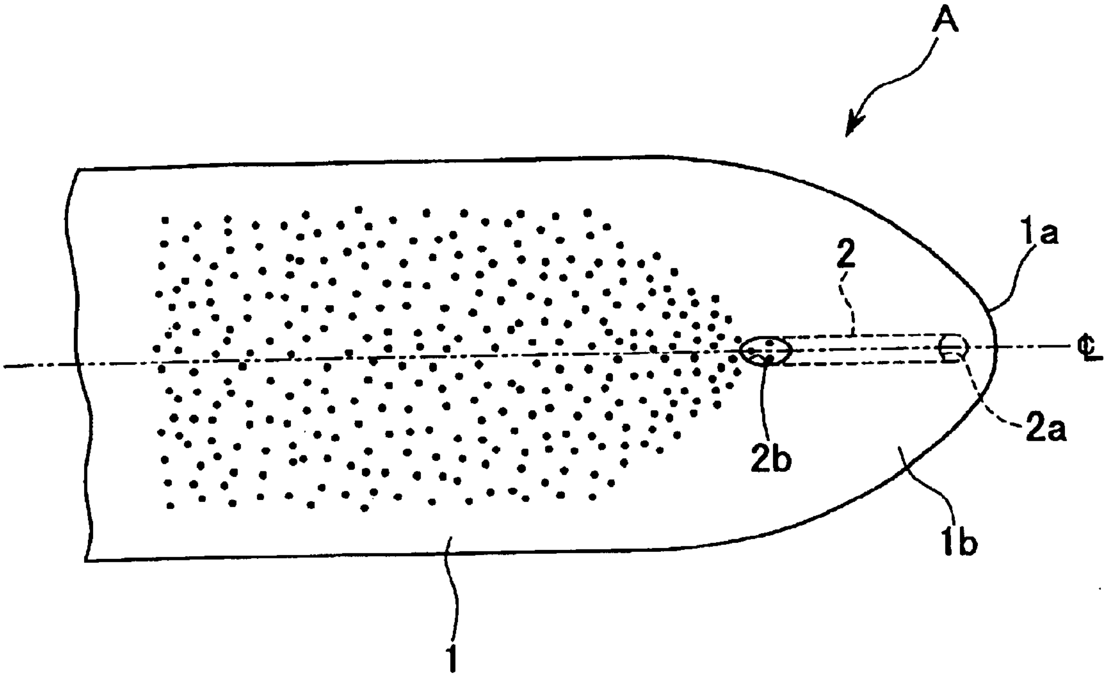
FIG. 2 is a bottom view of the friction reducing ship in the first embodiment.

FIG. 1 is a side view (starboard side) of key sections of a friction reducing ship S in this embodiment and an enlarged view of a section, and FIG. 2 is a bottom view. In these diagrams, a reference numeral 1 relates to the external hull plate of the ship; 2 to a water inlet pipe (water passage); 3 to an air intake pipe (air passage); 4 to the deck; 5 to an ejection part; A to air; B to a micro-bubble; F to a flowline; W to seawater (water); WL to a waterline. Here, of these structural elements, the water inlet pipe 2, air intake pipe 3 and the ejection part 5 comprise the bubble generation means BP.

In this friction reducing ship S, as shown in FIG. 1, the water inlet pipe 2 is provided at an angle to extend from the bow 1*a* at the water line WL on the external hull 1 to the bottom surface 1*b*, and an air intake pipe 3 is provided from the deck 4 to partway to the water inlet pipe 2. As shown in FIG. 2, this water inlet pipe 2 connects a circular shaped water inlet opening 2*a* provided in the widthwise center of the bow 1*a* and distanced away from the deck 4 by a given distance h1 to an oval shaped water discharge opening 2*b* provided in the widthwise center of the bottom section 1*b* of the ship near the bow 1*a*, and an air discharge opening 2*c* is provided partway thereof.

The location of the waterline WL changes according to the amount of load on the friction reducing ship S. In this embodiment, the above distance h1 is chosen so that effects of reducing the frictional resistance by the micro-bubbles B can be achieved when the motive power is fully taxed, by arranging the vertical location of the water inlet opening 2*a* to be below the waterline WL under the condition of the friction reducing ship S carrying the load. However, this invention is not limited to such a location, and the distance h1 can be chosen so that the water inlet opening 2*a* is below the waterline WL when the friction reducing ship S is not carrying any load.

In FIG. 1, the water inlet pipe 2 is drawn as a straight pipe of a constant diameter, but, in order to prevent an increase in the waves forming resistance of the friction reducing ship S as much as possible, it is preferable that the longitudinal shape be shaped so that the water (seawater W, for example) can flow into the water inlet opening 2*a* easily without encountering resistance, in other words, to minimize the resistance to inflow of seawater W and to enable to discharge the seawater W easily from the water discharge opening 2*b*, in other words, to minimize the resistance to discharging of the seawater W.

The air intake pipe 3 is for connecting the air intake opening 3*a* provided on the deck 4 and the air discharge opening 2*c*. In FIG. 1, the longitudinal shape of the air intake pipe 3 is drawn as a curved shape, but it is preferable that the longitudinal shape be a straight pipe so as to minimize the flow resistance of air A.

On the outside of the air discharge opening 2*c*, i.e., on the inside of the water inlet pipe 2, as shown in an enlarged view in FIG. 1, a dome-shaped ejection part 5 is provided so as to cover the air discharge opening 2*c* and to protrude toward the center of the water inlet pipe 2. At the top section of the ejection part 5, an air jet opening 5*a* is provided, so that the air A entering the air intake pipe 3 from the air intake opening 3*a* will jet out from the air jet opening 5*a* into the water inlet pipe 2.

Here, a three-dimensional shape of the ejection part 5 is designed so that the resistance to the seawater W flowing in the water inlet pipe 2 will be minimized, in other words, to minimize the coefficient of resistance. The height dimension H of the ejection part 5 is chosen, as will be described later, so that the water pressure (static pressure) at the air jet opening 5*a* creates a negative pressure state with respect to the pressure at the air intake opening 3*a* (atmospheric pressure), by selecting a desired size of the cross sectional area of the water inlet pipe 2, that is, the size is chosen so that the air A will jet out into the seawater W from the air jet opening 5*a*. Also, as will be described later, the distance h2 from the deck 4 (air intake opening 3*a*) to the air jet opening 5*a* is chosen appropriately so that the seawater W can create a negative static pressure state at the air jet opening 5*a*.

As described above, the bubble generation means BP in this embodiment is comprised simply by the water inlet pipe 2, the air intake pipe 3 and the ejection part 5, and the installation task is quite easy and the cost is low. Therefore, retrofitting is also relatively easy.

Next, the operation of the friction reducing ship S of such a construction will be explained in detail in the following with reference to the diagrams.

When the friction reducing ship S is cruising at a cursing speed v1, seawater W continue to flow in from the water inlet opening 2*a* at the ship's bow 1*a* into the water inlet pipe 2, and is delivered to the bottom section 1*b* from the water discharge opening 2*b*. If it is supposed that the speed of the seawater W flowing inside the water inlet pipe 2 is substantially the same as the cruising speed v1, the seawater W flowing in the water inlet pipe 2 may be considered to be an incompressible fluid which has a constant density ρ, and therefore, designating the cross sectional area (horizontal cross sectional area) of the water inlet pipe 2 by S1, cross sectional area of the water inlet pipe 2 at the location of the air jet opening 5*a* by S2, the following equation (4) can be obtained according to the known continuity equation for an incompressible fluid:

$$v1 \cdot S1 = v2 \cdot S2 \qquad (4)$$

That is, the flow velocity v2 of the seawater W at the location of the air jet opening 5*a* can be increased over the cruising speed v1 (=velocity of seawater W flowing through the water inlet pipe) in proportion to a ratio of the areas S1/S2.

Also, as for the seawater W (per unit mass of seawater W) above the air jet opening 5*a*, assuming that stream separation and the like does not occur and using the reference position of the potential energy as the height of the waterline WL, energy conservation principle can be established according to the Bernoulli's principle, as expressed by equation (5):

$$v2^2/2 + p/\rho + g \cdot h3 = C(\text{constant}) \qquad (5)$$

where, p is the static pressure of the seawater W at the air jet opening 5*a*; g is the gravitational acceleration; h3 is a height (refer to FIG. 1) of the air jet opening 5*a* measured from the waterline WL. Here, the height h3 represents a height below the waterline WL (reference position) so that it is a negative value.

Solving equation (5) for the static pressure ρ, and substituting in equation (4) produce equation (6) shown below:

$$p = \rho \cdot (C - v2^2/2 - g \cdot h3) = \rho \cdot \{C - (S1/S2)^2 \cdot v1^2/2 - g \cdot h3\} \qquad (6)$$

As can be understood readily from equation (6), the static pressure p is determined according to the cruising speed v1 of the friction reducing ship S, the height h3 of the air jet opening 5*a* from the waterline WL, or the ratio S1/S2 which is an area ratio of the cross sectional area S2 of the water inlet pipe 2 and the cross sectional area S1 of the water inlet pipe 2 at the air jet opening 5*a*. Of these parameters, cruising speed v1 is determined by various factors related to the friction reducing ship S so that it is not realistic to try to adjust this value for setting the static pressure p.

Therefore, it is more realistic to select design parameters for the friction reducing ship S in obtaining a negative state of static pressure p with respect to the atmospheric pressure, by increasing the absolute value of the height h3, i.e., decrease the depth of the air jet opening 5*a* in the water, or increasing the area ratio S1/S2 by reducing the cross sectional area S2 of the water inlet pipe 2 (increasing the protrusion area of the ejection part 5). However, these design parameters should be chosen appropriately according to the cruising speed v1, shape and size of the friction reducing ship S and the like.

In this embodiment, because the seawater W is introduced into the water inlet pipe 2 which is inclined from the bow 1*a* to the bottom section 1*b*, the height h3 of the air jet opening 5*a* from the waterline WL can be selected easily by choosing an appropriate value for the location of the air discharge opening 2*c* provided for the water inlet pipe 2.

Also, in this embodiment, the ratio S1/S2 is determined by the protrusion area of the ejection part 5 with respect to the water inlet pipe 2. A resistance force to the seawater W flowing inside the water inlet pipe 2 is created because of the presence of the ejection part 5, but as described above, by designing the three-dimensional shape of the ejection part 5 so as to minimize the coefficient of friction, generation of resistive force can be prevented irrespective of the protrusion area. However, considering that such resistive forces are generated by the ejection part 5, it is preferable to minimize the protrusion area of the ejection part 5 and adjust the height h3, i.e., to locate the air discharge opening 2*c* on the water inlet pipe 2 as shallow as possible in achieving a negative pressure state at the air jet opening 5*a*.

As described above, by producing a negative pressure state of the static pressure p of the seawater W at the air jet opening 5*a* with respect to the atmospheric pressure, air A is admitted into the air intake pipe 3 continually from the air intake opening 3*a* and is discharged from the air jet opening 5*a* into the sea water. The result that numerous micro-bubbles B are generated in the seawater W inside the water inlet pipe 2.

Then, micro-bubbles B thus generated are transported along the flowlines F of the seawater W and are discharged from the water discharge opening 2*b* to the bottom section 1*b*. In this embodiment, as shown in FIG. 2, because the water discharge opening 2*b* is located in the center section of the widthwise midpoint of the bottom section 1*b* near the bow section 1*a*, micro-bubbles B discharged from the water discharge opening 2*b* disperse along the flowline of the seawater W towards the stern of the ship to cover a wide area of the bottom section 1*b*. The result is a reduction in the frictional resistance of the external hull plate 1 of the bottom section 1*b* enveloped by the micro-bubbles B to lead to a reduction in the motive power required to move the friction reducing ship S, thus providing a saving in the fuel required for the motive power.

In any case, in this embodiment, it is necessary to design the longitudinal shape of the water inlet pipe 2 appropriately to minimize the resistance force generated by providing the water inlet pipe 2 and by designing the three-dimensional shape of the ejection part 5 appropriately to minimize the resistance force generated by providing the ejection part 5 inside the water inlet pipe 2, so as to be careful not to degrade the effect of the friction reduction brought about by the micro-bubbles B by the adverse effects of such resistance generating members.

It should be noted that this invention is not limited to the embodiment described above, such that the following modifications may be considered.

Figure 3A:
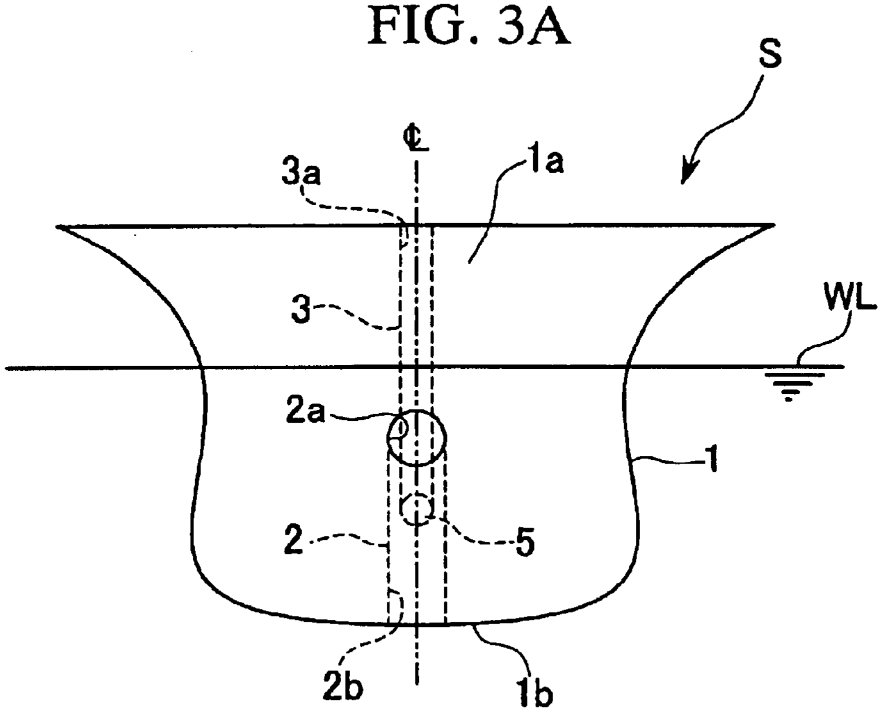
FIG. 3A is a first planar view seen from the bow section of the friction reducing ship in the first embodiment.
Figure 3B:
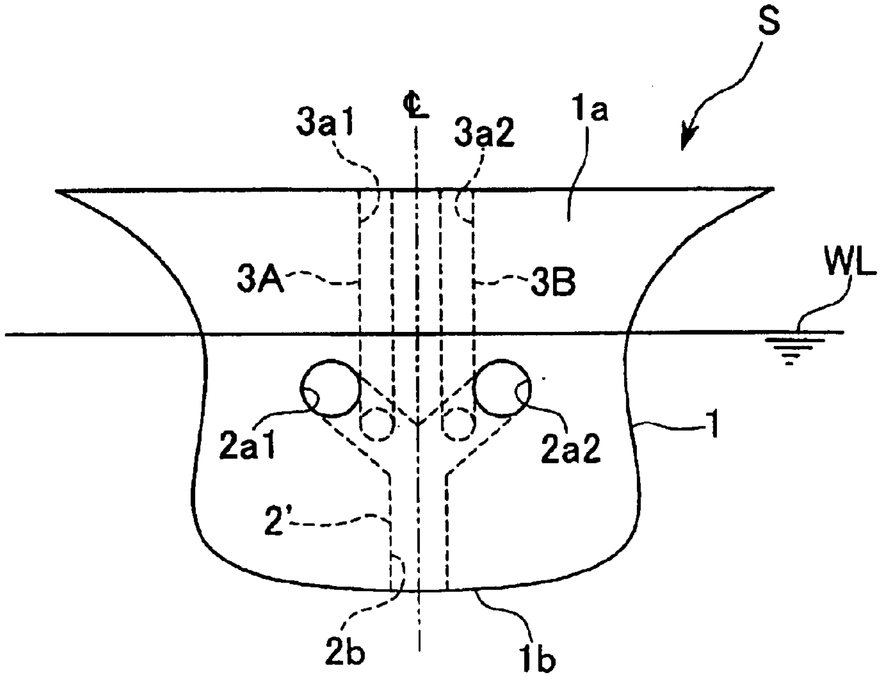
FIG. 3B is a second planar view seen from the bow section of the friction reducing ship in the first embodiment.
Figures 4, 5:
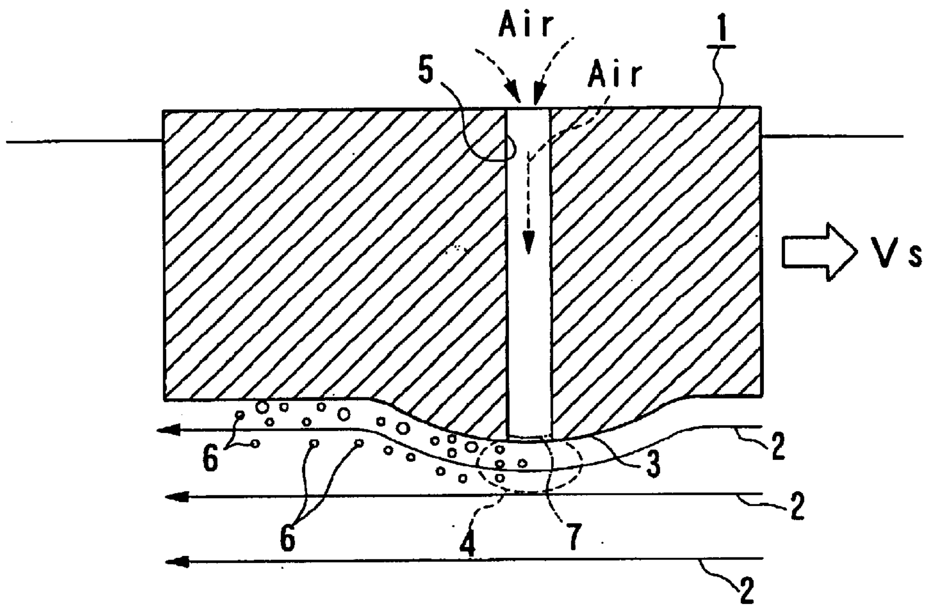
FIG. 4 is a conceptual diagram of a method of generating the bubbles in a second embodiment.
FIG. 5 is a table (Table 1) showing an example of the forces that act on a bubble in the water caused by the flow of water in the second embodiment.
Figure 6:
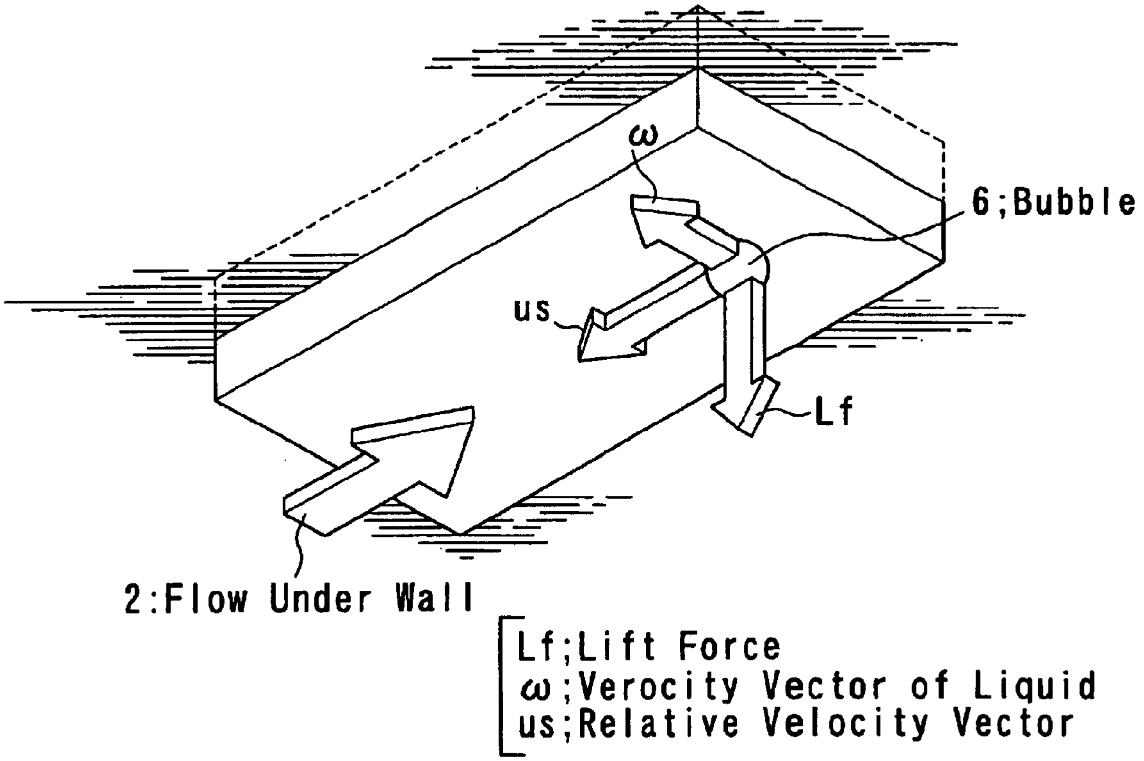
FIG. 6 is a schematic diagram of the forces that act on a bubble at the bottom surface in the second embodiment.
Figure 7:
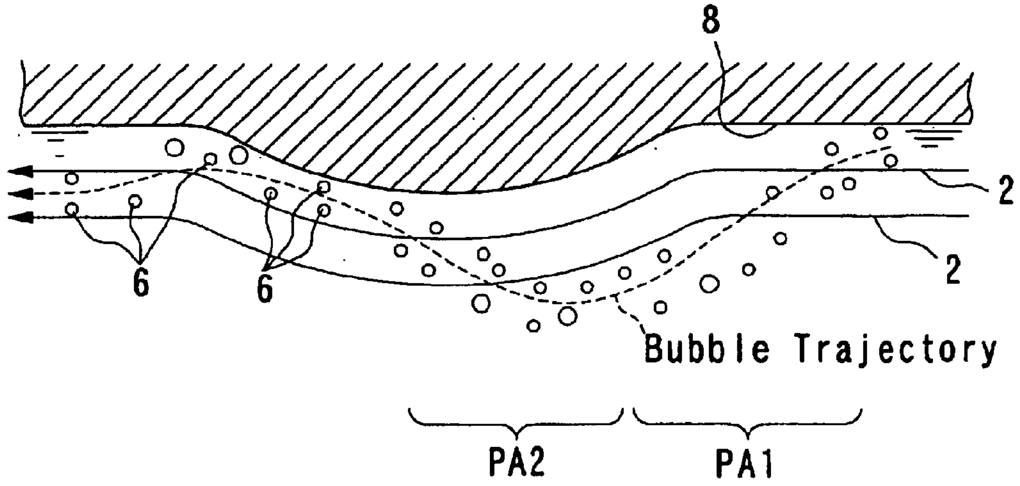
FIG. 7 is a schematic diagram of a flow of water and bubbles along a curved surface in the second embodiment.

(a) In the above embodiment, as shown in FIG. 3, seawater W is received from one water inlet opening 2*a* provided in the widthwise center of the bow section 1*a*, but as shown in FIG. 3*b*, a water inlet opening 2*a*1 may be provided on the starboard side of the bow section 1*a* and another water inlet opening 2*a*2 may be provided on the port side of the bow section 1*a*.

(b) In the above embodiment, the water discharge opening 2*b* is provided in the bottom section 1*b* in the widthwise center near the bow section 1*a* so that micro-bubbles B covers a wide area of the bottom section 1*b* of the ship by dispersion of micro-bubbles B, but the location of the water discharge opening 2*b* is not limited to such a location. For example, a plurality of water discharge points may be provided on the bottom section 1*b* of the ship, and by providing a multiple water inlet pipes or branching the water inlet pipe, micro-bubbles may be discharged to the bottom section 1*b* from each water discharge point.

(c) In the above embodiment, air intake opening 3*a* is provided on the deck 4, but the location of the air intake opening 3*a* is not limited to such a location. If it is not possible to locate it on the deck 4 due to restricting conditions, the air intake opening may be provided on the outer hull plate 1 above the waterline WL, for example.

B: Embodiment 2

Figure 8A:
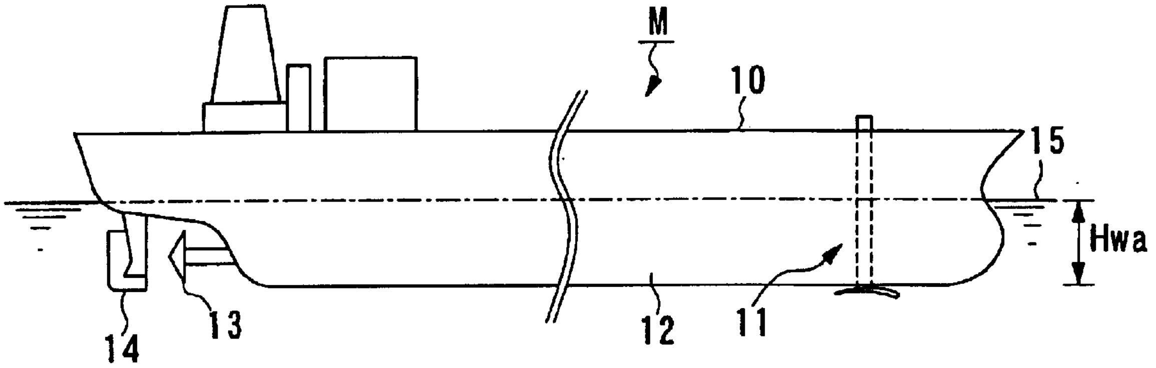
FIG. 8A is a schematic structural diagram of the friction reducing ship in the second embodiment.

In the following, an example of applying the method of reducing frictional resistance and friction reducing ship to a bulk ship such as a tanker or container ship will be explained with reference to the drawings. In FIG. 8A, M refers to a friction reducing ship, 10 to a ship body, 11 to a bubble generation apparatus, 12 to outer hull plate (submerged surface), 13 to a screw, 14 to a rudder, and 15 to the water surface (waterline).

Figure 8B:
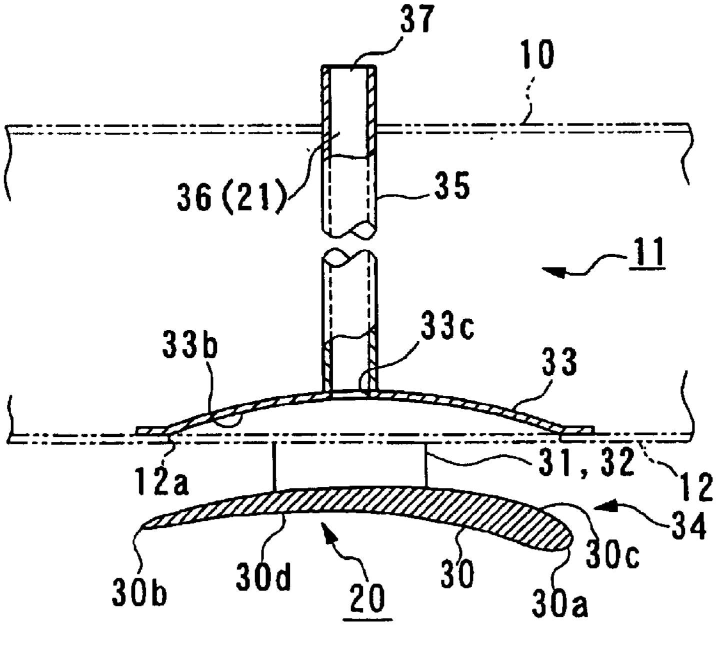
FIG. 8B is a diagram showing the details of the bubble generation apparatus used in the ship shown in FIG. 8A.

A bulk ship suitable for adopting as a friction reducing ship M is a VLCC (very large crude oil carrier) and the like, because, the outer hull plate 12 (submerged surface) of the ship below the waterline 15 is made relatively large compared with other types of ship. Further, the bubble generation apparatus 11 is disposed in the fore-section of the ship body 10. As shown in FIG. 8B, the bubble generation apparatus 11 is provided with a negative pressure forming section 20 disposed in the submerged surface 12, and a fluid passage 21 passing through the ship body 10 and communicating with the interior space at above and below the waterline 15.

The negative pressure forming section 20 forms a negative pressure region relative to the gaseous space (atmosphere), during cruising at a certain cruising speed Vs by utilizing the relative flow of the water with respect to the ship body 10. In this case, the negative pressure forming section 20 has a function of a (gas) detaching promotion section also to promote the gas bubbles to detach from the gas/liquid interface, as will be described later, and is constructed in such a way to increase the relative fluid speed in a specific location of the bottom section as well as to form a curved water flow to produce a 凸-shaped flow of water in the upward vertical direction.

Figure 9:
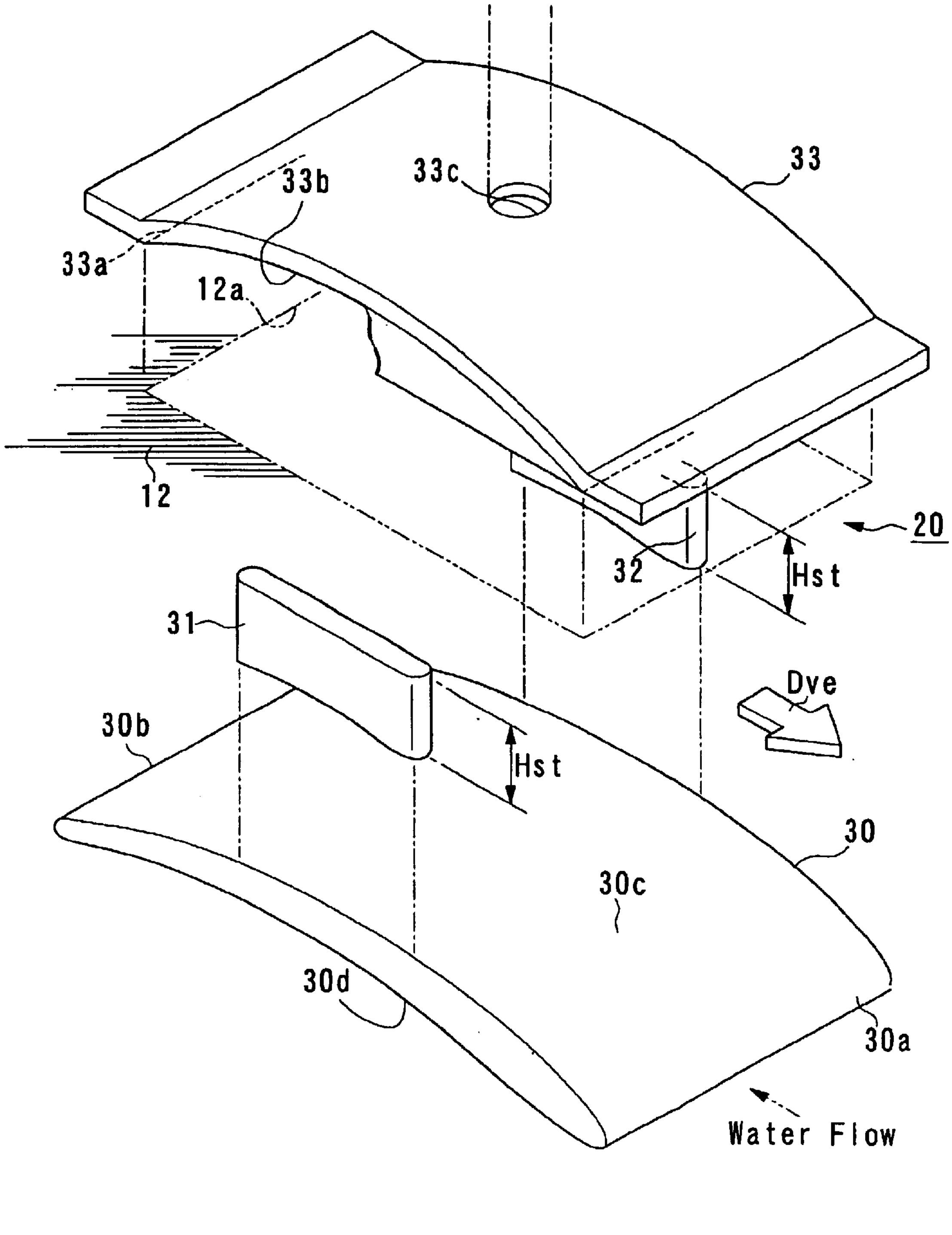
FIG. 9 is a perspective view of the structure of the negative pressure forming section shown in FIG. 8B.

Details of the negative pressure forming section 20 will be explained next. As shown in FIG. 9, the negative pressure forming section 20 is disposed so as to protrude into the water from the submerged surface of the ship body, and is provided with wing 30 disposed parallel to the submerged surface 12 at a given distance, struts 31, 32 disposed between the wing 30 and the outer hull plate 12 for supporting the wing 30, and a flow guiding body 33 disposed on the ship side of the wing 30 (inner side of the ship body, in this embodiment).

The wing 30 is shaped in various wing shapes such as NACA wing type, ogival wing type, and the shape is chosen to suit the shape of the ship and its cruising speed. In this case, wing 30 is formed in a 凸-shape to protrude towards the ship side. Also, the wing 30 is disposed in such a way that the front edge 30*a* and the rear edge 30*b* are oriented in the forward direction Dve of the ship, the wing surfaces 30*c*, 30*d* are oriented in the up- and down-directions, respectively, and further, it is disposed so that the uplifting force is applied on the wing 30 (during cruising, the flow velocity above the top wing surface 30*c* is faster than the flow velocity below the bottom wing surface 30*d*).

The cross sectional shape of the struts 31, 32 is chosen so as to offer low resistance to the flow of water, a wing type for example, and has a specific height Hst for specifying the spacing between the wing 30 and the submerged surface 12. Further, it is attached so that one edge surface abuts the exterior hull plate 12 and other edge surface abuts the wing 30.

The flow guiding body 33 is provided for directing the flow of water to form a curved shape (an arc shape) during cruising, and is formed in a open-box type having one surface open, and is fixed so that the open end 33*a* abuts the outer hull plate 12 and covers the opening 12*a* provided on the outer hull plate 12 from the inner side of the ship body 10. Also, the flow guiding body 33 is formed to conform to the shape of the wing 30, and has a curved surface 33*b*, which is parallel to the width direction of the ship body 10 (perpendicular to the cruising direction Dve of the ship body 10 within a horizontal plane) and the height from the outer hull plate 12 varies in a 凸-shape in the forward direction Dve of the ship body 10 (that is, curves in a 凸-shape in the vertical upward direction). Further, discharge opening 33*c* of a throughole type is provided near the center of the curved surface 33*b*.

These components of the negative pressure forming section 20 form a water passage 34 to serve as the detaching promotion section that curves vertically upward in a 凸-shape, as shown in FIG. 8B, along the forward direction Dve of the ship.

Also, the shape and positioning of the various components of the negative pressure forming section 20 are designed according to CFD (computational fluid dynamics) of flow field analysis so that the flow of water in the negative pressure forming section 20 during cruising conforms to a desired state. In this case, when the ship is cruising at a given velocity Vs, the flow of water in the vicinity of the negative pressure forming section 20 is adjusted so as to satisfy the following conditions a~d.

Condition a: water velocity (absolute value) in the water passage 34 is higher than the ship velocity Vs and the average flow velocity Vwa in the midsection 34*b* of the water passage 34 satisfies equation (2) described above, where ρ is the density of seawater, Hwa is the distance (water depth) from the waterline to the water passage 34.

Condition b: the flow velocity near the wing surface 30*c* is higher than the flow velocity in the vicinity of the discharge opening 33*c* of the flow guiding body 33.

Condition c: water flow must be directed downward from the discharge opening 33*c*.

Condition d: local eddy spots must exist in the flow path of the water passage.

To fulfill condition a, shape and positioning of the various components in the negative pressure forming section 20 are determined such that, for example: the cross sectional areas of flow in the inner side (bow section 34*a*, midsection 34*b*, stern section 34*c*) are smaller compared with those at the inlet opening of the water passage 34; and the cross sectional area of flow in the midsection 34*b* is smaller compared with that in the bow section 34*a* and the stern section 34*c*. Also, to fulfill condition b, the overall curvature of the wing surface 30*c* is chosen to be smaller (radius of curvature is larger) than that of the curved surface 33*b* of the flow guiding body 33. Also, to fulfill condition c, the curved surface 33*b* in the vicinity of the discharge opening 33*c* is made to curve upward in a 凸-shape, for example. Further, to fulfill condition d, the area and the shape of the water passage 34 is varied locally, for example.

On the other hand, the fluid passage 21 is comprised by an inner space 36 of the air induction pipe 35 communicating with the flow guiding body 33 in the negative pressure forming section 20. That is, one end of the fluid passage 21 is open to the gaseous space (atmosphere) by way of the air intake opening 37 of the air induction pipe 35 while other end is open to water by way of the discharge opening 33*c* of the flow guiding body 33.

The air induction pipe (AIP) 35 is installed so as to pass through the ship body 10 and to connect with the flow guiding body 33 in the negative pressure forming section 20, and the cross sectional area and the shape of the interior section are chosen so that a desired flow volume of the fluid can flow at a minimal pressure loss. Also, the air intake opening 37 is disposed in the bow section of the deck of the ship body 10.

Here, the material for making the negative pressure forming section 20 and the air induction pipe 35 includes preferably metals with some corrosion resistant treatment so that the surface is corrosion resistant mainly to seawater and resistant to attachment by marine organisms.

Also, the negative pressure forming section 20 may be provided such that one or more units are arranged according to the breadth of the bottom section of the ship and the air induction pipes 35 are arranged accordingly.

Figure 10A:
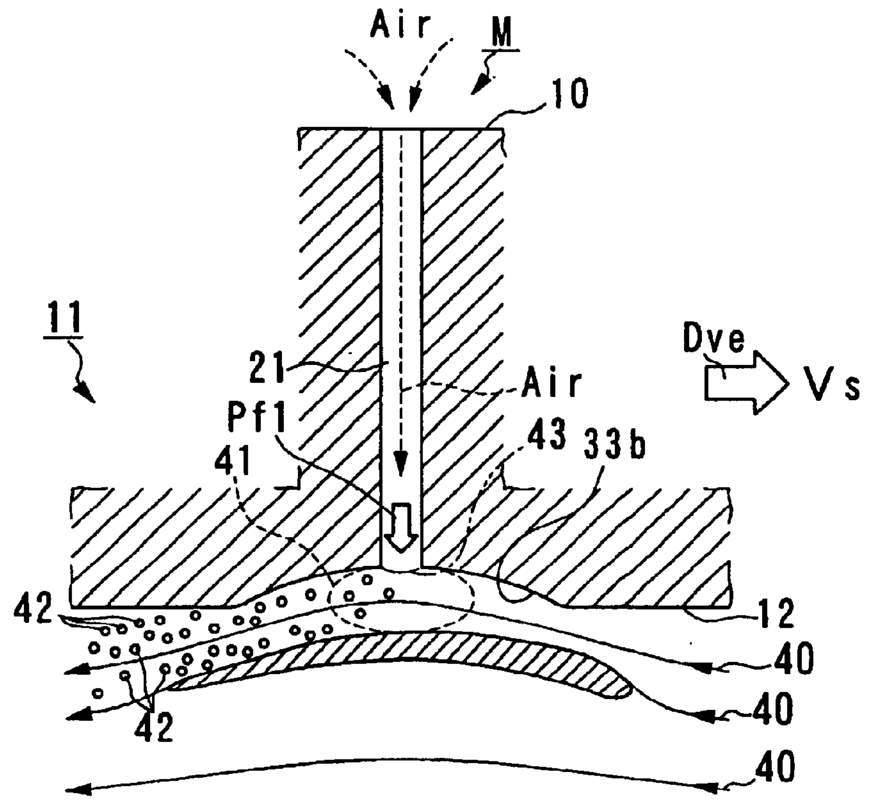
FIG. 10A is a first conceptual diagram to show a method of reducing the frictional resistance of a ship body in the second embodiment.

Next, the friction reducing ship M having such a structure and a method of reducing the frictional resistance will be explained with reference to FIGS. 10A and 10B.

In the stationary state of the ship, water (seawater) ingresses to about the same level as the surrounding of the ship body 10. When the ship body 10 begins to cruise using the thrust of the screw 13 (refer to FIGS. 13A, 13B), a water stream 40 relative to the ship body 10 is formed as shown in FIG. 10A. In the cruising state, at the bottom section of the ship, water flows along the wing section 30 of the negative pressure forming section 20, and where the flow path of the water passage 34 is narrowed, the velocity of flow through the water passage 34 is increased, and the static pressure is reduced locally. Then, when the ship body 10 reaches a certain cruising speed Vs (standard cruising speed, for example), a negative pressure region 41, which is a region of low pressure relative to atmospheric pressure, is formed in the center section 34*b* of the water passage 34 (due to condition a described above).

In this case, compared with the pressure at the air intake opening 37, the pressure in the vicinity of the discharge opening 33*c* facing the negative pressure region 41 is low so that the fluid (seawater and air) inside the fluid passage 21 is subjected to a pressure gradient force Pf1 such that, after the seawater is discharged from the fluid passage 21, the air flowing in from the air intake opening 37 is ejected into the water by flowing through the fluid passage 21. Then, the gas delivered into the water becomes mixed in the water as air bubbles 42, and the frictional resistance of the ship body 10 is reduced by the presence of numerous intervening bubbles 42 in the vicinity of the submerged surface 12.

The energy required to push the air into the water is primarily the energy for changing the position of the air. This energy is obtained by varying the flowing condition of the water by using the negative pressure forming section 20, and is less than the energy consumed in compressing the air and ejecting the compressed air into the water.

Further, for the formation of the negative pressure region 41, the shape of the negative pressure forming section 20 and the number of nozzles are the primary governing factors and the water depth has lesser influence so that the technology of this invention can be favorably adopted to bulk ships. Also, the structure of the bubble generation apparatus 11 is simple and compressor for the air is not required so that it is obvious that the ship building cost of the ship body 10 is less.

Figure 10B:
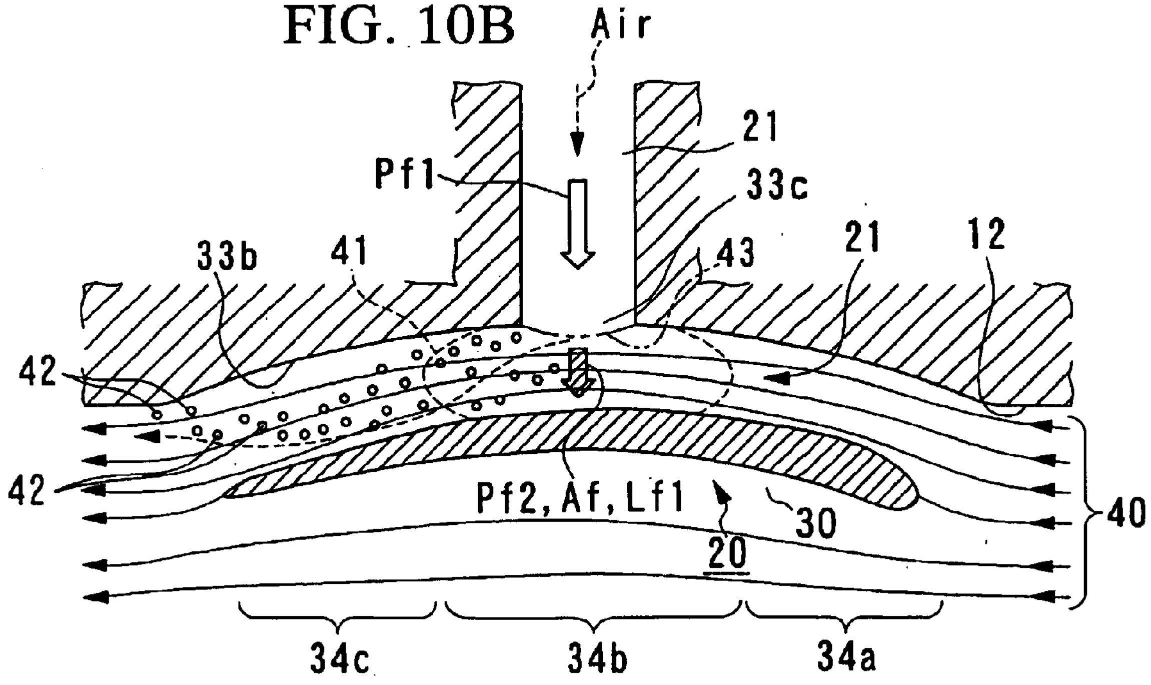
FIG. 10B is a second conceptual diagram to show a method of reducing the frictional resistance of a ship body in the second embodiment.

In this case, as shown in FIG. 10B, the water passage 34 forms the upward curving 凸-shaped flow so that the water that flowed through the discharge opening 33*c* descends by changing the flow direction so as to move away from the gas/liquid interface 43 (due to condition c). At this time, the bubbles 42 move away from the discharge opening 33*c* at an acceleration value higher than that of water. In other words, inertial force (additional momentum) due to the additional mass acts on the bubbles 42 in the direction (detaching direction) or the bubbles to detach them from the gas/liquid interface 43.

Further, because the water velocity flowing in the vicinity of the wing surface 30*c* in the water passage 34 is faster than the water velocity flowing in the vicinity of the discharge opening 33*c* of the flow guiding body 33 (due to condition b), so that the pressure at the negative pressure region 41 in the water becomes progressively lower, beginning at the gas/liquid interface 43 towards the water. For this reason, a pressure gradient force Pf2 acts on the bubbles 42 in the detaching direction.

Also, because the cross sectional area (and shape) of the water passage 34 varies locally, the water stream 40 in the curved water passage 34 exhibits large vortices locally (due to condition d). In this case, the water stream 40 exhibits a large eddy in the center section 34*b* of the curved water passage 34, where curvature of the curve is large. For this reason, lift force Lf1 acts on the bubbles 42 in a downward direction, which is a direction opposite to the curvature of the flow curve (detaching direction). Then, due to the forces operating in the detaching direction (additional inertial force Af, pressure gradient force Pf2, and lift force Lf1), the forces that resist the bubbles 42 become smaller, resulting not only to promote detaching of bubbles 42 from the gas/liquid interface 43, but also to reduce the energy required for sending the bubbles into the water.

That is, the water passage 34 to serve the function of detaching promotion section is formed by the wing 30 and the flow guiding body 33, and the water passage 34 forms a curved flow of water in such a way to generate vortices locally, so that in addition to the lift force L1, the pressure gradient force Pf2, additional momentum force Af are made to act on the bubbles 42 to promote detachment of the bubbles 42 from the gas/liquid interface 43, thus resulting in increasing the number of bubbles mixing in the water.

Also, because the wing 30 is subjected to upward lift force by the water stream 40, the bow side of the ship body 10 is elevated, for example, to reduce the submerged area of the ship body 10 to facilitate reduction in the frictional resistance.

The struts 31, 32 of the negative pressure forming section 20 serve to reduce the cross sectional area of the flow passage of the water passage 34, and also provides an advantage in increasing the force acting in the detaching direction to alter the flow lines as described above, in the center section 34*b* of the water passage 34 where the negative pressure region 41 is created.

The amount of bubbles 42 created in the negative pressure region 41 is influenced by the saturation vapor pressure determined by the surrounding conditions. That is, the excess portion of a gas that cannot dissolved in water exists as bubbles in the water. Therefore, by promoting detachment of bubbles 42 from the gas/liquid interface 43, less bubbles 42 dwell near the gas/liquid interface 43 and a desired amount of bubbles 42 can be mixed in the water in a stable manner to result in effectively and reliably reducing the frictional resistance.

Here, the bubbles 42 mixed into the water are formed at a lower internal pressure than the static pressure existing at the water depth so that, when the bubbles 42 are moving through a constant water depth (for example, when the bubbles move along the bottom section of the ship body), increasing water pressure acts on the bubbles 42 as they move away from the negative pressure region 41 so that the size of the bubbles 42 is gradually reduced. According to the results of study by the present inventors, it has been found that smaller the size of the bubbles more effective is the friction reducing effect of the bubbles. Therefore, the bubbles generated by negative pressure are advantageous for reduction in frictional resistance from such a viewpoint also.

Figure 11:
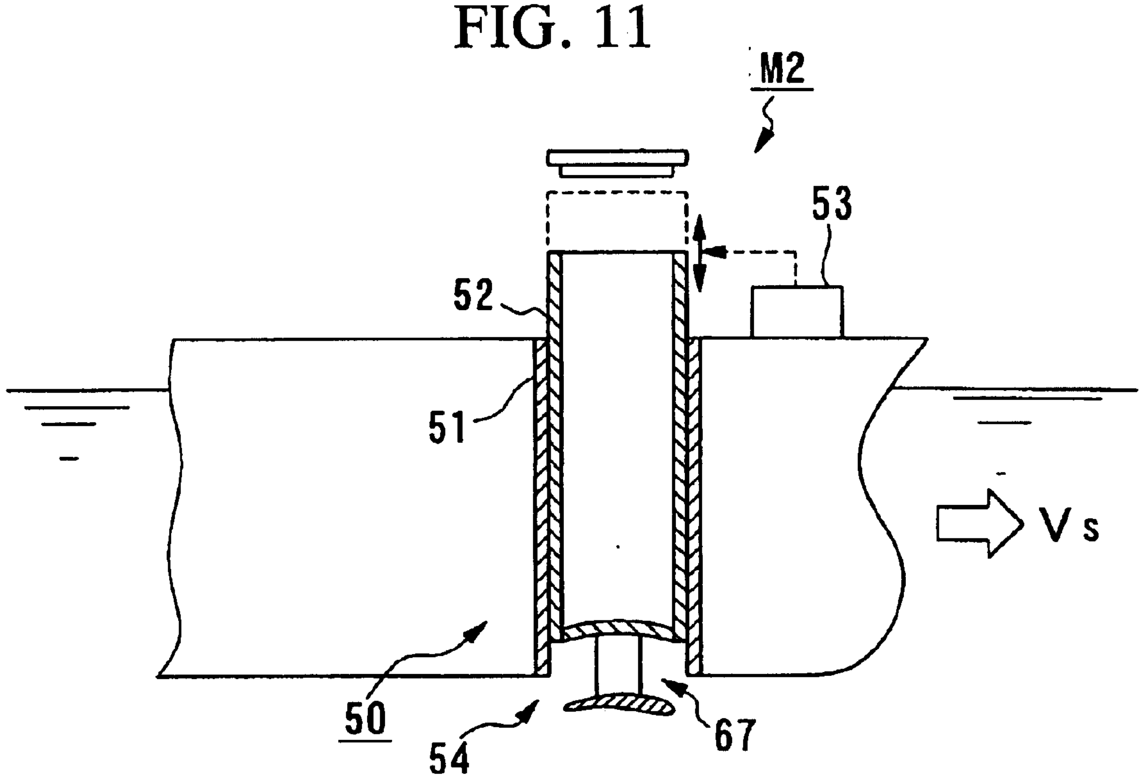
FIG. 11 is a schematic structural view of the friction reducing ship in the second embodiment.

FIG. 11 shows a variation of the friction reducing ship described above.

The friction reducing ship M2 is different from the ship described in the preceding embodiment in that the negative pressure forming section in the bubble generation apparatus is constructed so as to be vertically movable. The bubble generation apparatus 50 is comprised by: an outer tube 51 affixed to the ship body; an inner tube 52 serving as the air induction pipe (AIP) freely detachably inserted in the outer tube 51 so as to be freely vertically movable in the axial direction (up and down); and an elevation adjusting section 53 for adjusting the position (height) of the inner tube 52 in relation to the outer tube 51. The inner tube 52 is inserted from an opening at the top end section of the outer tube 51 in such a way that the negative pressure forming section 54 disposed on one end of the inner tube 52 is directed downward.

Figure 12:
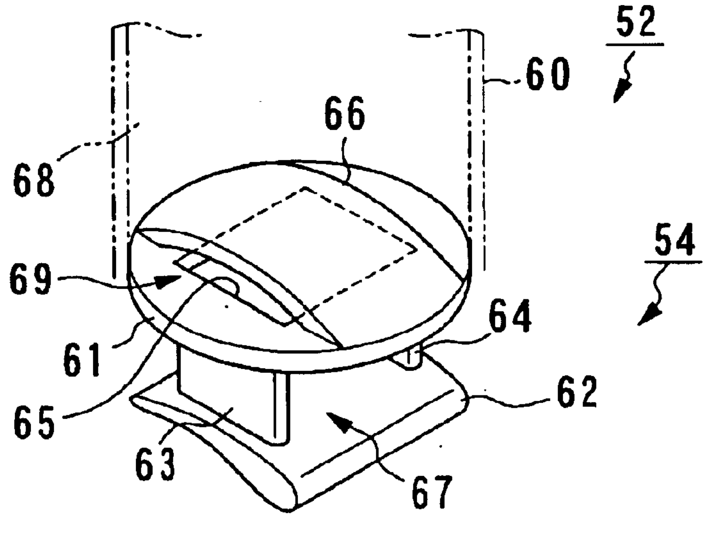
FIG. 12 is a perspective view of the structure of the negative pressure forming section shown in FIG. 11.

The negative pressure forming section 54, as shown in FIG. 12, is comprised by: a plate member 61 disposed so as to cover the end section of the pipe member 60; a wing 62 disposed roughly parallel to the plate member 61 with a given spacing; struts 63, 64 for supporting the wing 62; and a curved plate 66 disposed on the plate member 61 so as to cover the opening 65 serving as the discharge opening from the inside the pipe member 60. These component parts includes a water passage 67 of a 凸-shape curving upward to serve as the detaching promoting section in the negative pressure forming section 20 following along the forward direction of the ship. Also, the inner space of the inner tube 52 serving as the fluid passage 68 opens downward by way of the space 69, formed between the curved plate 66 and the plate member 61, and the discharge opening 65.

Returning to FIG. 11, the elevation adjusting section 53 is used to adjust the protruding state (protrusion height) of the negative pressure forming section 54, depending on the cruising state, and includes other components not shown in the diagram such as a drive section containing a motor and the like to move the inner tube 52 to a certain location, a fixation section to fix the position of the inner tube 52 in a certain location.

The friction reducing ship M2 having the bubble generation apparatus 50 of such a construction can vary the protruding position of the negative pressure forming section 54 by means of the elevation adjusting section 53, thereby controlling the degree of increase in resistance caused by the negative pressure forming section 54 as well as adjusting the flow pattern of the water in the vicinity of the negative pressure forming section 54 to a desirable state.

Figure 13A:
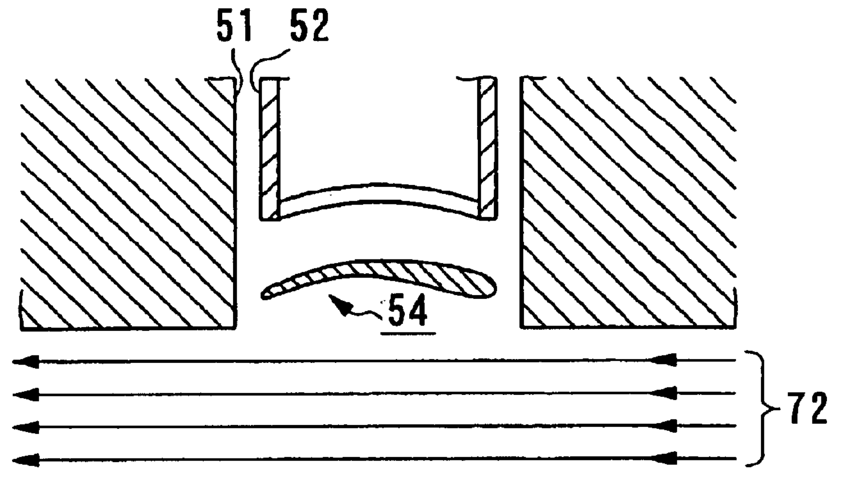
FIG. 13A is a first flow diagram showing the relation between the placement of the negative pressure forming section shown in FIG. 11 and water flow.
Figure 13B:
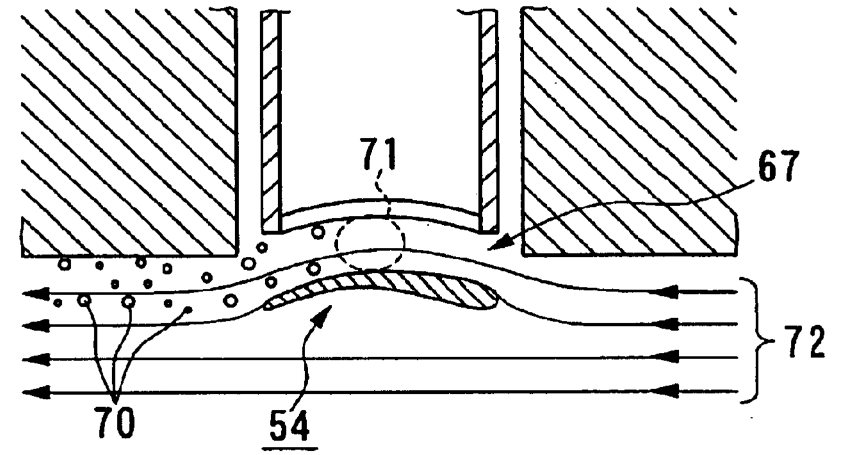
FIG. 13B is a second flow diagram showing the relation between the placement of the negative pressure forming section shown in FIG. 11 and water flow.
Figure 13C:
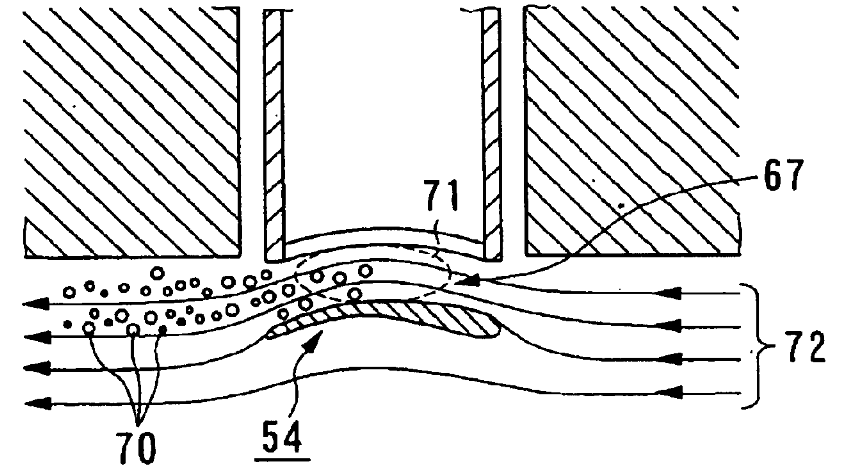
FIG. 13C is a third flow diagram showing the relation between the placement of the negative pressure forming section shown in FIG. 11 and water flow.

For example, when the ship is stationary or moving at a low speed so that the friction reducing effects are minor, the negative pressure forming section 54 is disposed inside the ship body (inside the submerged surface), as shown in FIG. 13A so as to suppress increase in resistance due to the negative pressure forming section 54. On the other hand, when the ship is cruising at a certain speed, the negative pressure forming section 54 is protruded into the water (downward) from the bottom section, as shown in FIGS. 13B, 13C, to generate bubbles 70 in the water to reduce frictional resistance of the ship. When the protruding height of the negative pressure forming section 54 is varied, flow rate per unit time of the water flowing into negative pressure forming section 54 is altered, and the flow velocity of water is the water passage 67 is changed. Accordingly, the state of the negative pressure region 71 (static pressure and the like) and the magnitude of the force acting from the gas/liquid interface in the detaching direction is altered, and the amount of bubbles 70 included in the water is changed.

That is, by altering the protruding height of the negative pressure forming section 54, the pressure in the negative pressure region 71 and the water flow 72 near the negative pressure region 71 are controlled to adjust the amount of bubbles 70 generated. Then, effective reduction of frictional resistance is carried out by introducing an appropriate amount of bubbles 70 to suit the cruising speed of the ship.

Further, during the maintenance work for the bubble generation apparatus 50, the inner tube 52 is removed from the outer tube 51, and the inner tube 52 as well as the inner surface of the outer tube 51 are cleaned in a well equipped cleaning facility. Therefore, maintenance work of the bubble generation apparatus 50 is not cumbersome.

Also, shapes and combination of components shown in this embodiment are only one example, and various variations within the scope of this invention is possible to meet design requirements and other performance demands. For example, the following variation is included in this invention.

In the present embodiment, the negative pressure forming section 20 has two functions of forming a negative pressure region in the water and forming a water stream to generate a force in the detaching direction, and provides an advantage to enable mixing of bubbles and water within a small space. However, it is permissible to separate a function to generate a negative pressure region (negative pressure forming section) and a function to generate a water stream to promote detachment (detaching promoting section) in two distinct sections. By separating into two distinct functions, it becomes easier to control the amount of bubbles to be incorporated in the water.

Also, the shape of the wing of the negative pressure forming section is designed so as to minimize an increase in the resistance to moving through the water. Therefore, the wing shape in the plan view described in the above embodiment is not limited to a rectangular shape, and includes other shapes such as a triangle shaped wing. Also, in this embodiment, this invention is applied to a bulk ship, but it is not limited to such an application, and it is applicable to other ship types such as highspeed ships. The size, number and location of negative pressure forming sections are chosen suitably according to the shape of the ship.

C: Embodiment 3

In the following, an application of a friction reducing ship in Embodiment 3 to a bulk ships such as a tanker or container ship will be explained.

Figure 14A:
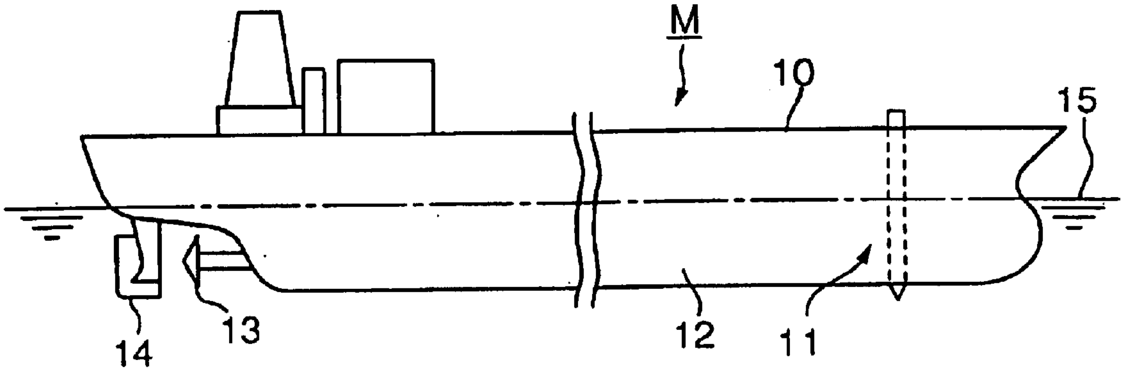
FIG. 14A is a schematic structural diagram of the friction reducing ship in a third embodiment.

In FIG. 14A, M refers to a friction reducing ship, 10 to a ship body, 11 to a bubble generation apparatus, 12 to an external hull plate (submerged surface), 13 to a screw, 14 to a rudder, and 15 to a water surface (waterline). A bulk ship suitable for adopting as a friction reducing ship M is a VLCC (very large crude oil carrier) and the like, because the area of the bottom section in the external hull plate (submerged surface) 12 of the ship body below the waterline 15 is made larger relative to the lateral hull of the ship body. Further, the bubble generation apparatus 11 is disposed in the fore-section (bow section) of the ship body 10.

Figure 14B:
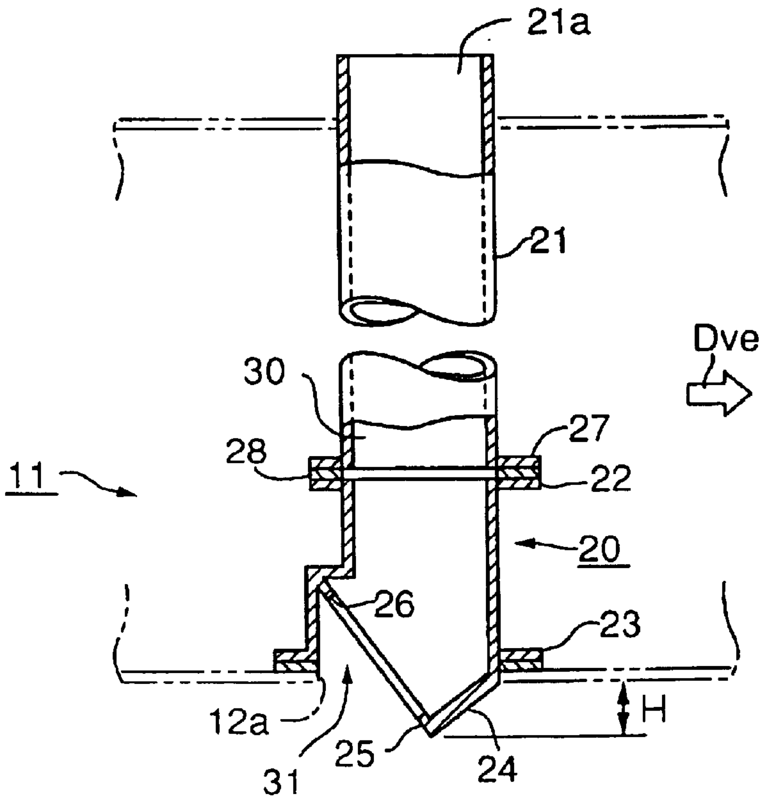
FIG. 14B is an enlarged view of the bubble generation apparatus 11 used in the ship shown in FIG. 14A.
Figure 15:
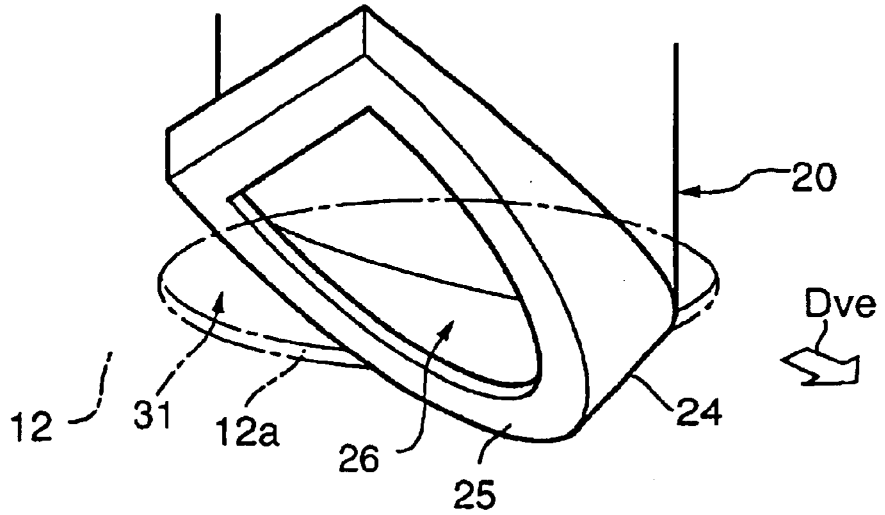
FIG. 15 is a perspective view of an overall structure of the negative pressure forming section 23 shown in FIG. 14B.

As shown in FIG. 14B, the bubble generation apparatus 11 is provided with a flow guiding body 20 disposed in the opening 12*a* provided in the bottom section, and an air induction pipe (AIP) 21 connected to the flow guiding body 20. The flow guiding body 20 is constructed overall as a component member of a pipe-shape having a hollow internal section, and flanges 22, 23 are provided at the both ends in the axial direction for connecting to the air induction pipe 21 or to the external hull plate 12. Also, at one end (downward end) connected to the external hull plate 12 are provided, as shown in FIG. 15, a fore-inclined surface 24 to serve as the negative pressure forming section that extends at an angle to the axial direction and looking towards the forward direction (in the bow direction), and an aft-inclined surface 25 disposed in the stern side and looking towards the back side of the forward direction (stern side), and the edges of these inclined surfaces 24, 25 are coupled together in part so as to form a protrusion of a spear shape. Here, the aft-inclined surface 25 has a hollow opening for the flow guiding body 20 to serve as the discharge opening 26 comprised by a throughole.

Returning to FIG. 14A, the air induction pipe 21 is comprised primarily of pipe shaped members, and is installed through the ship body and is connected to the flow guiding body 20 through the flange 27. By connecting the air induction pipe 21 and the flow guiding body 20, a fluid passage 30 to serve as the internal space is formed. The fluid passage 30 is open at one end to the gaseous space (atmosphere) by way of the air intake opening 21*a* of the air induction pipe 21, while other end opens into water by way of the discharge opening 26*a*. Here, the fluid passage 30 (flow guiding body 20 and the inner space of the air induction pipe 21) is designed to flow a desired amount of the fluid at minimal pressure loss by choosing its cross sectional area and the shape appropriately.

Here, the shape and positioning of each component of the bubble generation apparatus 11 are chosen according to the results of flow field analysis and operational tests using CFD so as to obtain a desired flow of water during cruising in the stern side of the flow guiding body 20.

In this case, the fore-inclined surface 24 of the flow guiding body 20 is disposed so as to protrude at a certain height H from the submerged surface 12 during cruising at a speed Vs so that a negative pressure region in the water at a pressure lower than the gaseous space (atmosphere) is formed in the back side of the flow guiding body 20 by the flow of water relative to the ship body.

Also, by connecting the flow guiding body 20 to the outer hull plate 12, a depression 31 is formed on the submerged surface 12, and the aft-inclined surface 25 of the flow guiding body 20 is disposed at an angle to the submerged surface 12 from the inside of the depression 31 to exterior section so that the discharge opening 26 provided in the aft-inclined surface 25 faces backward and a part is disposed inside the depression 31 and other section protrudes from the submerged surface 12 of the ship body.

Here, the material for making the flow guiding body 20 and the air induction pipe 21 includes preferably metals with some corrosion resistant treatment so that the surface is corrosion resistant mainly to seawater and resistant to attachment by marine organisms. Also, the negative pressure forming section 11 may be provided such that one or more units are arranged according to the breadth of the bottom section of the ship. Numerals 28, 29 shown in FIG. 14B refer to packing for connecting flanges.

Figure 16:
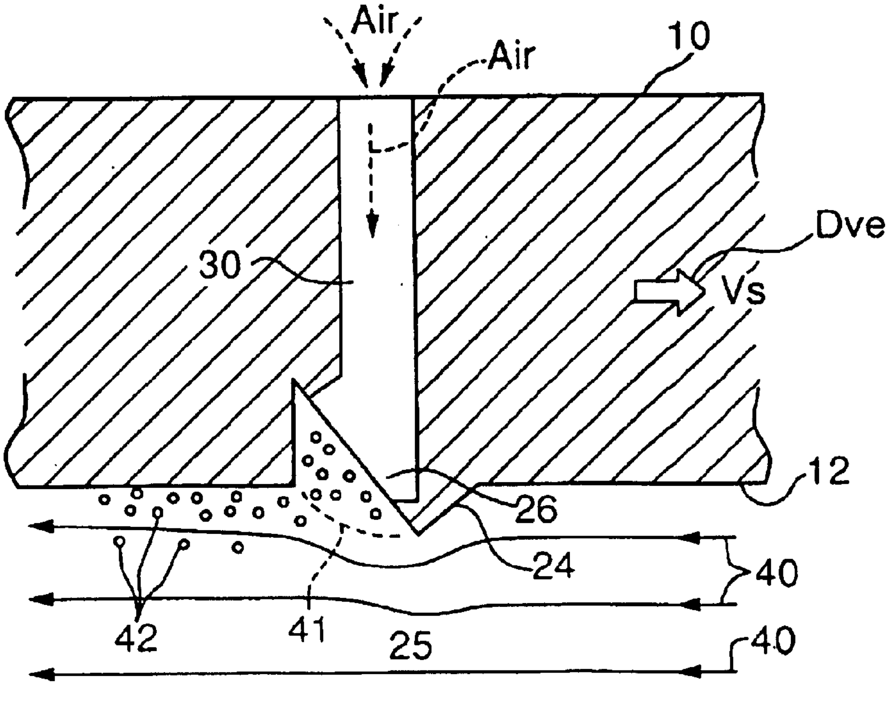
FIG. 16 is a schematic diagram of the method of reducing the frictional resistance for a ship body in the third embodiment.

Next, the friction reducing ship M having such a structure and a method of reducing the frictional resistance will be explained with reference to FIG. 16.

In the stationary state of the ship, water (seawater) ingress into the fluid passage 30 (flow guiding body 20 and the inner space of the air induction opening 21 shown in FIG. 14B) to about the same level as the surrounding of the ship body 10. When the ship body 10 begins to cruise using the thrust of the screw 13 (refer to FIG. 14A), a water stream 40 relative to the ship body 10 is formed. In the cruising state, at the bottom section of the ship, the water passage is narrowed by the fore-inclined surface 24 of the flow guiding body so that the velocity of water flowing along the bottom section increases, and the acute angle of the protruding end forms a separation layer in the water, and such actions lead to local lowering of the static pressure in the back side of the fore-inclined surface 24, i.e., aft-inclined surface 25 side. Then, when the ship 10 reaches a certain cruising speed Vs (standard cruising speed, for example), a negative pressure region 41, which is a region of lower pressure relative to the atmospheric pressure, is formed in the water in the aft-inclined surface 25 side.

In this case, compared with the pressure at the air intake opening 21*a*, the pressure in the vicinity of the discharge opening 26 facing the negative pressure region 41 is low so that the fluid (seawater and air) inside the fluid passage 30 is subjected to a pressure gradient force such that, the seawater is discharged from the fluid passage 30 and the air flowing in from the air intake opening 21a is ejected into the water by flowing through the fluid passage 30. Then, the gas delivered into the water becomes mixed in the water as air bubbles 42, and numerous intervening bubbles 42 in the vicinity of the submerged surface 12 gather in the vicinity of the submerged surface 12 of the ship body 10 to lead to reduction in the frictional resistance of the ship body 10.

The energy required to push the air into the water is primarily the energy for changing the position of the air. This energy is obtained by varying the flowing condition of the water by using the fore-inclined surface 24, and is less than the energy consumed in compressing the air and ejecting the compressed air into the water. For this reason, the energy expended in cruising is effectively reduced by lowering the frictional resistance of the ship body 10.

Here, in this embodiment, because the discharge opening 26 for ejecting air into the water is located on the aft-inclined surface 25 disposed at an angle to the submerged surface 12 of the ship body, compared with the case of disposing the discharge opening on a surface parallel to the submerged surface 12, the area of the opening of the discharge opening 26 can be made larger within a given region of the submerged surface 12. Further, the aft-inclined surface 25 is disposed from the inside to the outside of the depression 31 on both sides of the submerged surface 12, and a part of the discharge opening 26 is disposed on the inside of the depression 31 so that, even when a discharge opening 26 having a wide opening area is to be disposed, the height of the protrusion of the fore-inclined surface 24 (and aft-inclined surface 25) from the submerged surface 12 of the ship body can be controlled so that it presents lesser resistance to the water stream 40.

Therefore, in this embodiment, it enables to eject a large amount of bubbles 42 from the discharge opening 26 of a large opening area while suppressing an increase in resistive force to the water stream 40 so as to achieve an effective reduction in frictional resistance.

Further, it is considered that the formation of the negative pressure region 41 is controlled primarily by the shape of the fore- and aft-inclined surfaces and the number of nozzles, and is less affected by the depth of water, and therefore, the present technology can be favorably adapted to bulk ships.

Here, the bubbles 42 mixed into the water are formed at a lower internal pressure than the static pressure existing at the water depth so that, when the bubbles 42 are moving through a constant water depth (for example, when the bubbles move along the bottom section of the ship body), increasing water pressure acts on the bubbles 42 as they move away from the negative pressure region 41 so that the size of the bubbles 42 is gradually reduced. According to the results of study by the present inventors, it has been found that smaller the size of the bubbles more effective is the friction reducing effect of the bubbles. Therefore, the bubbles generated by negative pressure region 41 are advantageous for reduction in frictional resistance from such a viewpoint also.

Also, the structure of the bubble generation apparatus 11 is simple and an apparatus to pressurize the gas is not required so that it is obvious that the ship building cost of the ship body 10 is less.

Also, shapes and combination of components shown in this embodiment are only one example, and various variations within the scope of this invention is possible to meet design requirements and other performance demands. For example, in the above embodiment, this invention is applied to a bulk ship but it is not limited to such an application, and it is applicable to other ship types such as highspeed ships. The size, number and location of negative pressure forming sections are chosen suitably according to the shape of the ship.

D: Embodiment 4

In the following, an application of a friction reducing ship in Embodiment 4 to a bulk ships such as a tanker or container ship will be explained.

Figure 17A:
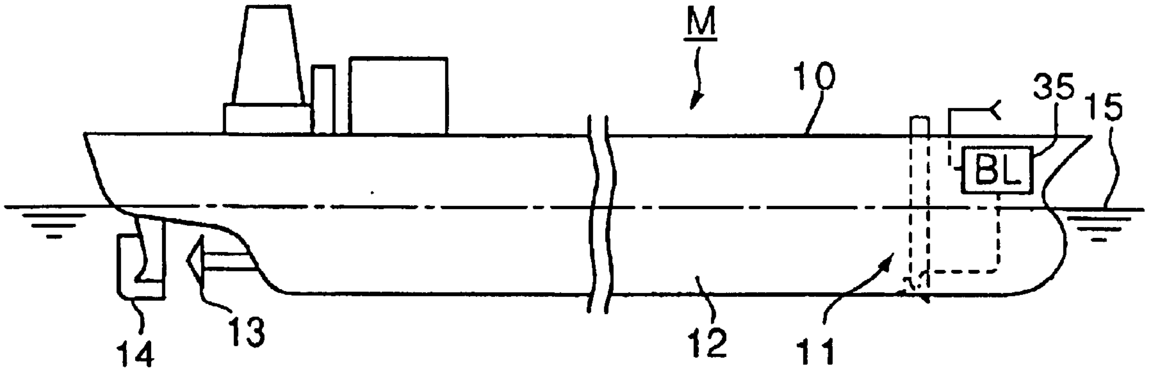
FIG. 17A is a schematic structural diagram of the friction reducing ship in a fourth embodiment.

In FIG. 17A, M refers to a friction reducing ship, 10 to a ship body, 11 to a bubble generation apparatus, 12 to an external hull plate (submerged surface), 13 to a screw, 14 to a rudder, and 15 to a water surface (waterline). A bulk ship suitable for adopting as a friction reducing ship M is a VLCC (very large crude oil carrier) and the like, because the area of the bottom section in the external hull plate (submerged surface) 12 of the ship body below the waterline 15 is made larger relative to the lateral hull of the ship body. Further, the bubble generation apparatus 11 is disposed in the fore-section (bow section) of the ship body 10.

Figure 17B:
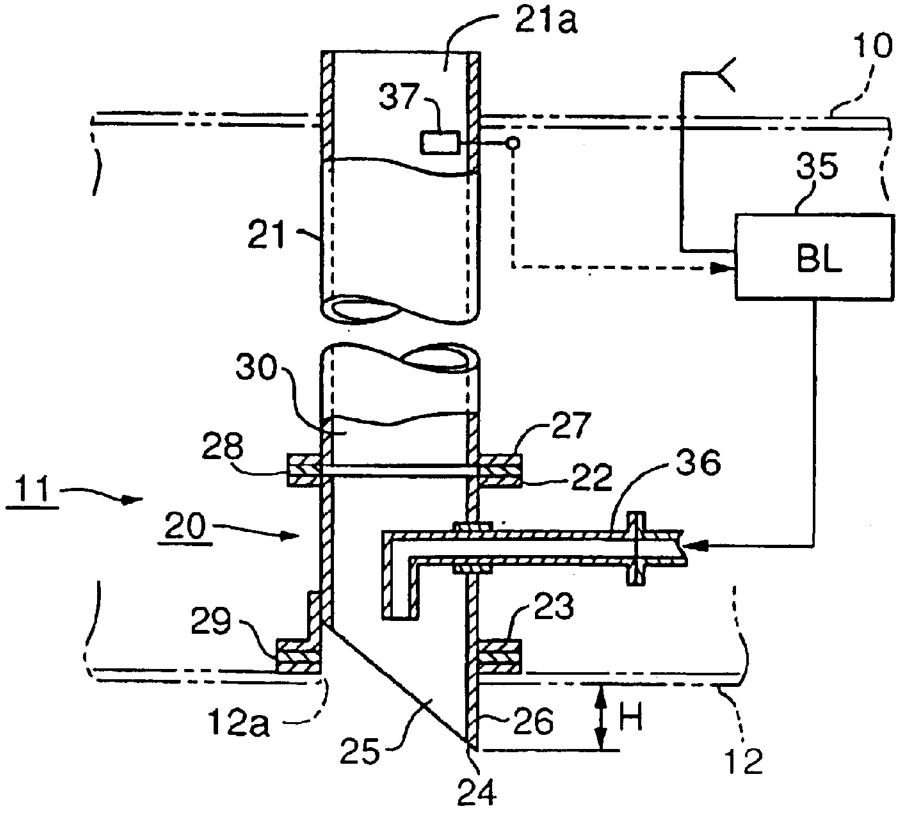
FIG. 17B is an enlarged view of the bubble generation apparatus 11 used in the ship shown in FIG. 17A.

As shown in FIG. 17B, the bubble generation apparatus 11 is provided with a flow guiding body 20 disposed in the opening 12a provided in the bottom section, and an air induction pipe (AIP) 21 connected to the flow guiding body 20. The flow guiding body 20 is constructed overall as a component member of a pipe-shape (tube shape for example) having a hollow internal section, and flanges 22, 23 are provided at both ends in the axial direction for connecting to the air induction pipe 21 or to the external hull plate 12. Also, at one end surface (downward end) connected to the external hull plate 12 is formed at an angle to the axial direction (inclined surface 24), and a discharge opening 25 comprised by a throughhole is provided on the inclined surface 24 to serve as an opening for the hollow section of the flow guiding body 20, and the discharge opening 25 (inclined surface 24) is disposed so as to face backward (stern side). Further, the flow guiding body 20 is disposed in such a way that a part of the inclined surface 24 protrudes from the submerged surface 12, and the negative pressure forming section is served by a part of the lateral surface 26 protruding at right angles from the submerged surface 12.

The air induction pipe 21 is comprised primarily of pipe shaped members, and is installed through the ship body 10 and is connected to the flow guiding body 20 through the flange 27. By connecting the air induction pipe 21 and the flow guiding body 20, a fluid passage 30 to serve as the internal space is formed. The fluid passage 30 is open at one end to the gaseous space (atmosphere) by way of the air intake opening 21a of the air induction pipe 21, while the other end opens into water by way of the discharge opening 25. Here, the fluid passage 30 (flow guiding body 20 and the inner space of the air induction pipe 21) is designed to flow a desired amount of the fluid at minimal pressure loss by choosing its cross sectional area and the shape appropriately.

Here, the shape and positioning of each component of the bubble generation apparatus 11 are chosen according to the results of flow field analysis and operational tests using CFD (computational fluid dynamics) so as to obtain a desired flow of water during cruising in the stern side of the flow guiding body 20.

That is, the shape and positioning of each component of the bubble generation apparatus 11 are chosen according to the results of flow field analysis and operational tests using CFD so as to obtain a desired flow of water during cruising in the stern side of the flow guiding body 20.

That is, when the ship is cruising at a certain speed Vs, the protruding height of the lateral surface 26 of the flow guiding body 20 from the submerged surface 12 is determined so that a negative pressure region of a lower pressure than the gaseous space (atmosphere) is formed in the rear of the flow guiding body 20 by a relative flow of water against the ship body 10.

Also, the bubble generation apparatus 11 is provided with an air supply apparatus 35 to supply air at a given timing into the fluid passage 30. The air supply apparatus 35 is used to charge air into the flow guiding body 20 by way of an air supply pipe 36 by altering the kinetic state of the air admitted from the gaseous space such as a blower or air pump. The air supply timing is determined by a control apparatus or an operator, not shown in the diagram, according to the results of measurements by an instrument 37 installed at the air intake opening 21*a* of the air induction pipe 21. In this case, when the flow rate into the air induction pipe 21 exceeds a given value, for example, the control apparatus commands the air supply apparatus 35 to begin air supply operation. The instrument 37 used includes instruments capable of measuring a gas flow, such as a flow meter and velocity meter.

Further, the material for making the flow guiding body 20 and the air induction pipe 21 includes preferably metals with some corrosion resistant treatment so that the surface is corrosion resistant mainly to seawater and resistant to attachment by marine organisms. Also, the negative pressure forming section 11 may be provided such that one or more units are arranged according to the breadth of the bottom section of the ship. Numerals 28, 29 shown in FIG. 17B refer to packing for connecting flanges.

Figure 18:
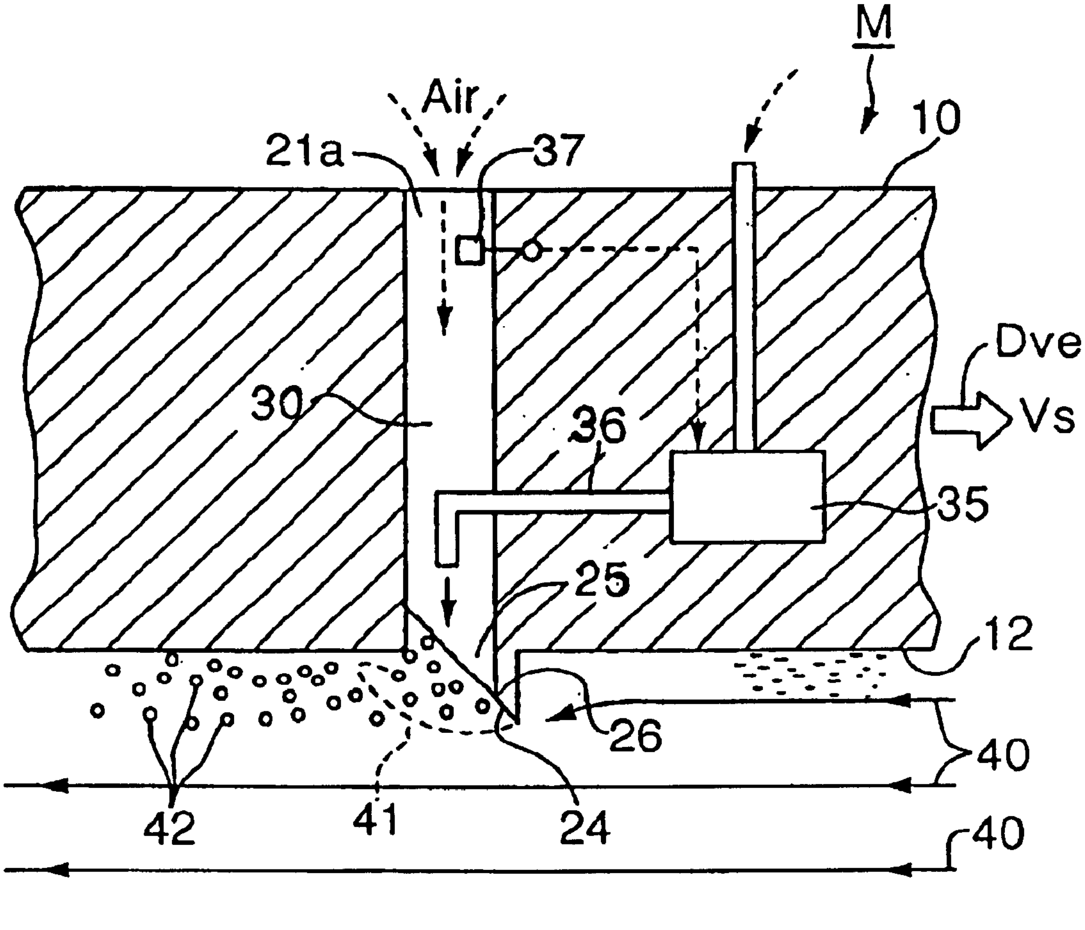
FIG. 18 is a schematic diagram of the method of reducing the frictional resistance for a ship body in the fourth embodiment.

Next, the friction reducing ship M having such a structure and a method of reducing the frictional resistance will be explained with reference to FIG. 18.

In the stationary state of the ship, water (seawater) ingress into the fluid passage 30 (flow guiding body 20 and the inner space of the air induction opening 21 shown in FIG. 17B) to about the same level as the surrounding of the ship body 10. When the ship body 10 begins to cruise using the thrust of the screw 13 (refer to FIG. 17A), a water stream 40 relative to the ship body 10 is formed.

In the cruising state, at the bottom section of the ship, the water passage is narrowed by the lateral surface 26 of the flow guiding body 20 so that the velocity of water flowing along the bottom section increases, and the acute angle of the protruding end of the lateral surface 26 forms a separation layer in the water. Such actions lead to local lowering of the static pressure in the back side of the lateral surface 26, i.e., in the water in the inclined surface 24 side. Then, when the ship body 10 reaches a certain cruising speed Vs (standard cruising speed, for example), a negative pressure region 41, which is a region of lower pressure relative to the atmospheric pressure, is formed in the water in the inclined surface 24 side.

In this case, compared with the pressure at the air intake opening 21*a*, the pressure in the vicinity of the discharge opening 25 facing the negative pressure region 41 is low so that the fluid (seawater and air) inside the fluid passage 30 is subjected to a pressure gradient force such that, the seawater is discharged from the fluid passage 30 and the air flowing in from the air intake opening 21*a* is ejected into the water by flowing through the fluid passage 30. Then, the gas delivered into the water becomes mixed in the water as bubbles 42, and numerous intervening bubbles 42 in the vicinity of the submerged surface 12 gather in the vicinity of the submerged surface 12 of the ship body 10 to lead to reduction in the frictional resistance of the ship body 10.

The energy required to push the air into the water is primarily the energy for changing the position of the air. This energy is obtained by varying the flowing condition of the water by using the lateral surface 26, and is less than the energy consumed in compressing the air and ejecting the compressed air into the water. For this reason, the energy expended in cruising is effectively reduced by lowering the frictional resistance of the ship body 10.

However, in this friction reducing ship M, when the ship is cruising at a certain speed Vs, the pressure gradient force created by the negative pressure region 41 reaches a roughly constant value so that the amount of bubbles 42 ejected into the water also becomes essentially constant. Therefore, in this embodiment, for the purpose of further reducing the energy consumption effectively during cruising, gas (air) is supplied at a given timing into the fluid passage 30 using the air supply apparatus 35. That is, when the volume of flow into the air induction pipe 21 measured by the instrument 37 exceeds a given value, a control apparatus or an operator (includes remote operation) controls the air supply apparatus 35 and air is supplied into the fluid passage 30. By so doing, the volume of air flowing in the fluid passage 30 is increased, and numerous bubbles are ejected from the discharge opening 25. Therefore, the frictional resistance of the ship 10 is further reduced.

In this case, because the pressure inside the fluid passage 31 is negative relative to atmospheric pressure, the energy required to supply air into the supply pipe 36 is very small. In other words, because the pressure gradient force acts on the air inside the supply pipe 36, it is only necessary to enhance the air motion by using the air supply apparatus 35 to flow a large volume of air through the fluid passage 30. Therefore, in this friction reducing ship M, in addition to the pressure gradient force generated by the negative pressure region 41, air motion is assisted by the air supply apparatus 35 using little energy to enable to eject a large volume of air bubbles 40 into the water.

Also, in this embodiment, the discharge opening 25 for ejecting air into the water is provided on the inclined surface 24, which is disposed at an angle to the submerged surface 12. Therefore, compared with the case of disposing the discharge opening within a plane parallel to the submerged surface 12, the area of opening of the discharge opening within a given area of the submerged surface 12 is large, and is suitable for ejecting a large volume of bubbles 42.

Further, it is considered that the formation of the negative pressure region 42 is controlled primarily by the shape of the negative pressure forming section (lateral surface 26 of the flow guiding body) and the number of nozzles, and is less affected by the depth of water, and therefore, the present technology can be favorably adapted to bulk ships.

Also, shapes and combination of components shown in this embodiment are only one example, and various variations within the scope of this invention is possible to meet design requirements and other performance demands. In the above embodiment, this invention is applied to a bulk ship but it is not limited to such an application, and it is applicable to other ship types such as highspeed ships. The size, number and location of the bubble generation apparatus 11 are chosen according to the shape of the ship. Also, the cross sectional shape of the flow guiding body 20 (or air induction pipe 21), such as cylindrical tube or angular tube, is chosen suitably so as to minimize resistance to a flowing fluid.

E: Embodiment 5

Figure 19A:
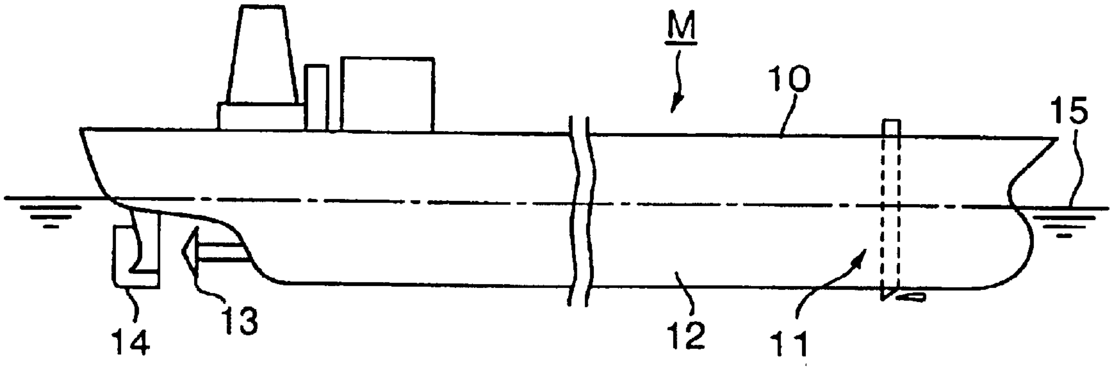
FIG. 19A is a schematic structural diagram of the friction reducing ship in a fifth embodiment.

In the following, an application of a friction reducing ship in Embodiment 5 to a bulk ships such as a tanker or container ship will be explained. In FIG. 19A, M refers to a friction reducing ship, 10 to a ship body, 11 to a bubble generation apparatus, 12 to an external hull plate (submerged surface), 13 to a screw, 14 to a rudder, and 15 to a water surface (waterline). A bulk ship suitable for adopting as a friction reducing ship M is a VLCC (very large crude oil carrier) and the like, because the area of the bottom section in the outer hull plate (submerged surface) 12 of the ship body below the waterline 15 is made larger relative to the lateral hull of the ship body. Further, the bubble generation apparatus 11 is disposed in the fore-section (bow section) of the ship body 10.

Figure 19B:
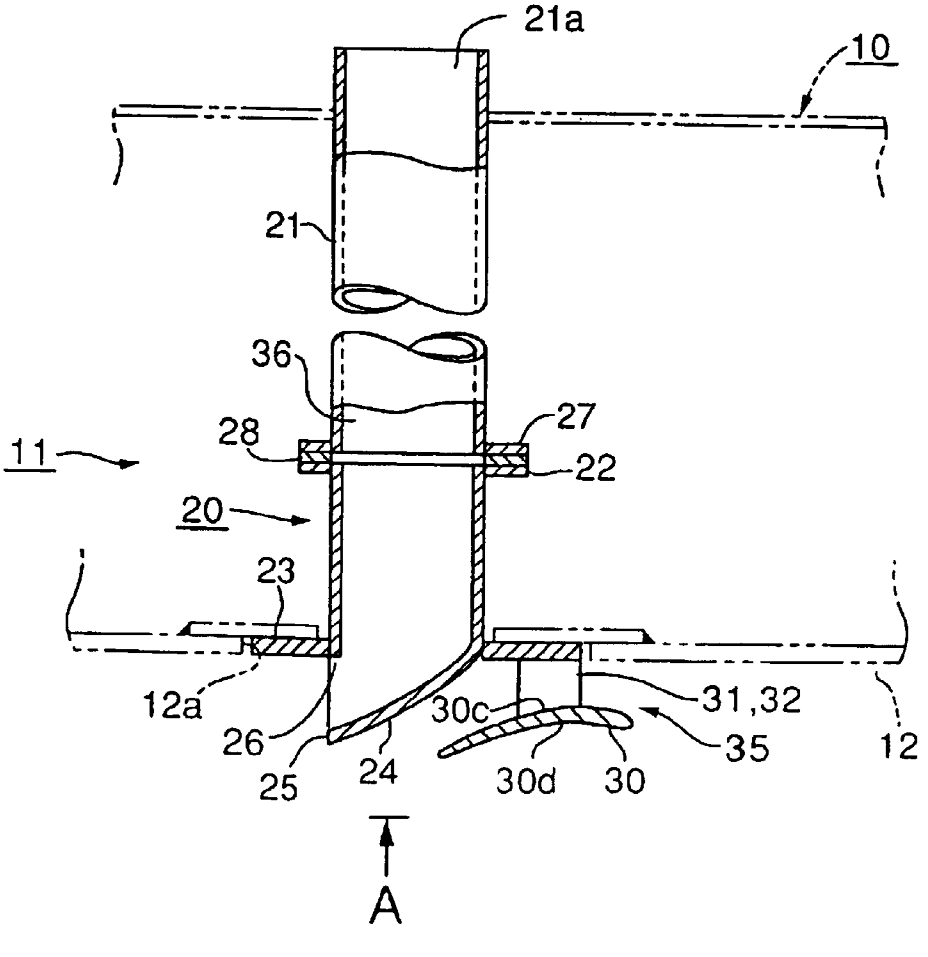
FIG. 19B is an enlarged view of the bubble generation apparatus 11 used in the ship shown in FIG. 19A.

As shown in FIG. 19B, the bubble generation apparatus 11 is provided with a flow guiding body 20 disposed in the opening 12*a* provided in the bottom section, and an air induction pipe (AIP) 21 connected to the flow guiding body 20. The flow guiding body 20 is constructed overall as a component member of a pipe-shape having a hollow internal section, and flanges 22, 23 are provided at the both ends in the axial direction for connecting to the air induction pipe 21 or to the external hull plate 12. Also, at one end surface (downward end) connected to the external hull plate 12, an inclined surface 24 (or a curved surface) is formed to protrude from the submerged surface 12 of the ship body 10 and facing the forward direction (bow section) at an angle to the axial direction. The inclined surface 24 is provided so as to gradually increase its height from the submerged surface 12 towards the stern of the ship. And, on the lateral surface 25 of the rear of the inclined surface 24, a discharge opening 26 facing the rear of the ship (stern side) comprised by a throughole is provided to serve as an opening for the hollow section of the flow guiding body 20. Further, in the forward direction of the inclined surface 24, wing members (wing 30, 31, 32) are provided, whose cross sections are formed in a wing shape.

Figure 20:
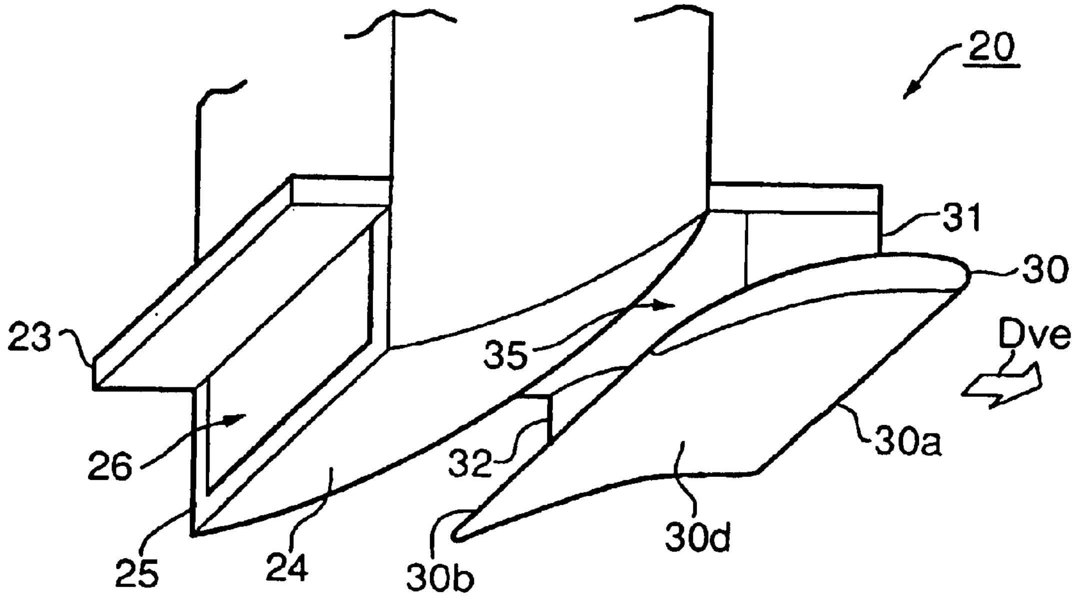
FIG. 20 is a perspective view of a portion of the fluid guide body in the fifth embodiment.
Figure 21:
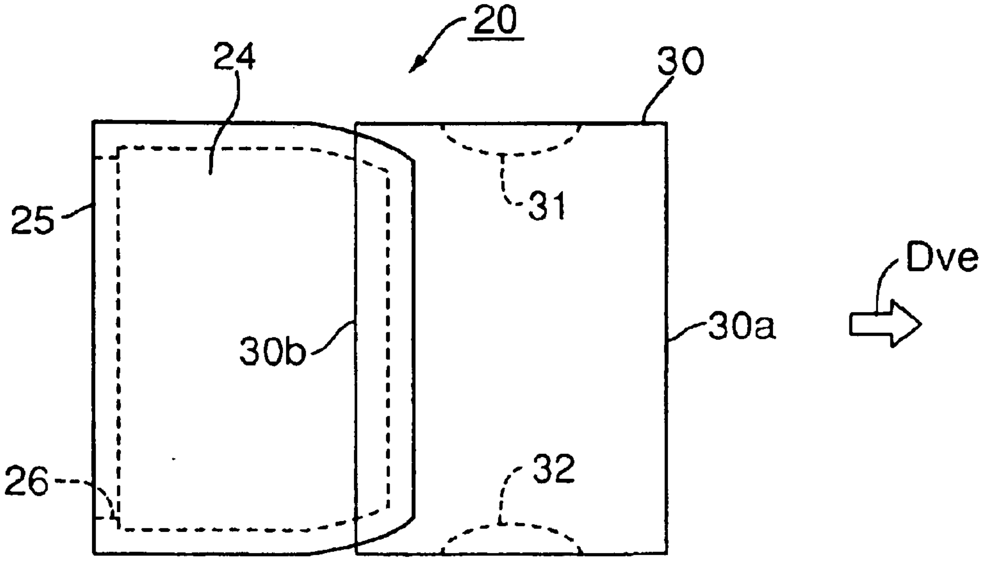
FIG. 21 is a perspective view in the A-direction shown in FIG. 19B.

That is, as shown in FIGS. 20, 21, in the front section of the flow guiding body 20, a first wing 30 is disposed at a given distance to the submerged surface 12 (refer to FIGS. 19A, 19B) of the ship body and roughly in parallel, and the second wings 31, 32 are disposed between the first wing 30 and the external hull plate 12 for supporting the first wing 30. The wings 30, 31, 32 shaped in various wing shapes such as NACA wing type, ogival wing type, and the shape is chosen to suit the shape of the ship and its cruising speed. In this case, the first wing 30 has the leading edge 30*a* and the trailing edge 30*b* oriented in the forward direction Dve, and the wing surfaces 30*c* (refer to FIG. 19B), 30*d* are oriented in the up- and down-directions, and further, they are disposed so that the lift force is applied upward (flow velocity above the top wing surface 30*c* facing upward is faster than the flow velocity below the bottom wing surface 30*d* facing downward). The wings 30, 31, 32 form a curved water passage 35 of a 凸-shape facing vertically upward along the forward direction Dve of the ship.

Returning to FIG. 19B, the air induction pipe 21 is comprised primarily of pipe shaped members, and is installed through the ship body 10 and is connected to the flow guiding body 20 through the flange 27. By connecting the air induction pipe 21 and the flow guiding body 20, a fluid passage 36 to serve as the internal space is formed. The fluid passage 36 is open at one end to the gaseous space (atmosphere) by way of the air intake opening 21*a* of the air induction pipe 21, while other end opens into water by way of the discharge opening 26*a*. Here, the fluid passage 30 (flow guiding body 20 and the inner space of the air induction pipe 21) is designed to flow a desired amount of the fluid at minimal pressure loss by choosing its cross sectional area and the shape appropriately.

Here, the shape and positioning of each component of the bubble generation apparatus 11 are chosen according to the results of flow field analysis and operational tests using CFD so as to obtain a desired flow of water during cruising in the stern side of the flow guiding body 20.

That is, when the ship is cruising at a certain speed Vs, the protruding height of the inclined surface 24 of the flow guiding body 20 from the submerged surface 12 is determined so that a negative pressure region of a lower pressure than the gaseous space (atmosphere) is formed in the rear of the flow guiding body 20 by a relative flow of water against the ship body 10. Further, flow of water circulating around the wings 30, 31, 32 is formed by the wings 30, 31, 32, and they are designed so that the velocity of water circulating along the inclined surface 24 of the water passage 35 and the flow guiding body 20 is increased.

Further, the material for making the flow guiding body 20 and the air induction pipe 21 includes preferably metals with some corrosion resistant treatment so that the surface is corrosion resistant mainly to seawater and resistant to attachment by marine organisms. Numerals 28, 29 shown in FIG. 19B refer to packing for connecting flanges.

Next, the friction reducing ship M having such a structure and a method of reducing the frictional resistance will be explained with reference to FIGS. 22A, 22B.

In the stationary state of the ship, water (seawater) ingress into the fluid passage 36 (flow guiding body 20 and the inner space of the air induction opening 21 shown in FIG. 19B) to about the same level as the surrounding of the ship body 10. When the ship body 10 begins to cruise using the thrust of the screw 13 (refer to FIG. 19A), a water stream 40 relative to the ship body 10 is formed.

In the cruising state, at the bottom section of the ship, the water passage is narrowed by the inclined surface 24 of the flow guiding body 20 so that the velocity of water flowing along the bottom section increases, and the acute angle of the protruding end of the inclined surface 24 forms a separation layer in the water. Such actions lead to local lowering of the static pressure in the back side of the inclined surface 24. Then, when the ship 10 reaches a certain cruising speed Vs (standard cruising speed, for example), a negative pressure region 41, which is a region of lower pressure relative to the atmospheric pressure, is formed in the water in the rear of the inclined surface 24.

In this case, compared with the pressure at the air intake opening 21*a*, the pressure in the vicinity of the discharge opening 26 facing the negative pressure region 41 is low so that the fluid (seawater and air) inside the fluid passage 36 is subjected to a pressure gradient force such that, the seawater is discharged from the fluid passage 36 and the air flowing in from the air intake opening 21*a* is ejected into the water by flowing through the fluid passage 36. Then, the gas delivered into the water becomes mixed in the water as air bubbles 42, and numerous intervening bubbles 42 in the vicinity of the submerged surface 12 gather in the vicinity of the submerged surface 12 of the ship body 10 to lead to reduction in the frictional resistance of the ship body 10.

The energy required to push the air into the water is primarily the energy for changing the position of the air. This energy is obtained by varying the flowing condition of the water by using the inclined surface 24 of the flow guiding body 20 protruding from the submerged surface 12, and is less than the energy consumed in compressing the air and ejecting the compressed air into the water. For this reason, the energy expended in cruising is effectively reduced by lowering the frictional resistance of the ship body 10.

Also, in this embodiment, the acute angle of protrusion of the lateral surface 25 causes not only stream separation but also cavitation. For this reason, gas and water are mixed intimately at the interface between the gas phase and the liquid phase due to the stirring actions caused by the separation region and cavitation to promote detachment of the bubbles 42 from the gas/liquid interface.

Further, in this embodiment, the wings 30, 31, 32 are disposed in the front section of the flow guiding body 20, and circulating flows are generated around the wings 30, 31, 32. That is, as shown in FIG. 22B, a circulating flow r heading towards the stern of the ship is formed around the first wing 30 on the water passage 35 side of the wing surface 30*c*, and heading towards the bow section of the ship on the opposite side of the wing surface 30*d*. In such a case, on the water passage 35 side of the wing surface 30*c*, flow velocity is increased by the addition of the circulating flow Γ to the water stream 40, thereby the flow velocity along the inclined surface 24 is increased and the static pressure at the negative pressure region 41 is further reduced. Therefore, the pressure gradient force on the fluid in the fluid passage 36 is increased, and a large amount of air (bubbles) is ejected into the water.

Figure 22A:
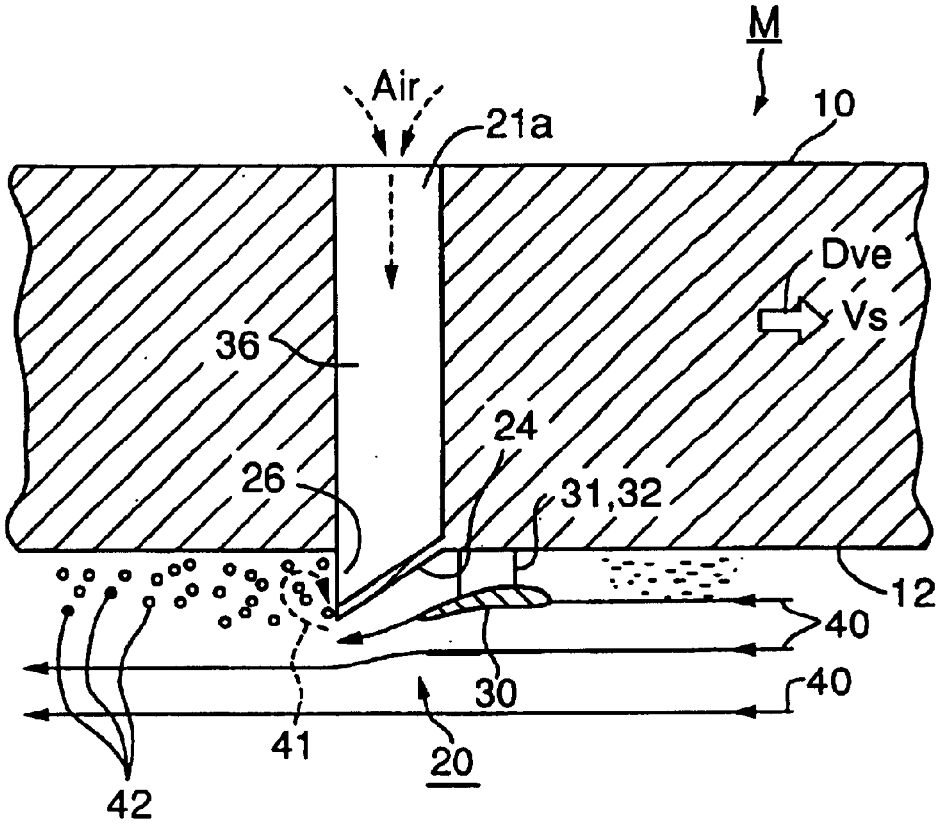
FIG. 22A is a first schematic diagram of a method of reducing the frictional resistance for a ship body in the fifth embodiment.
Figure 22B:
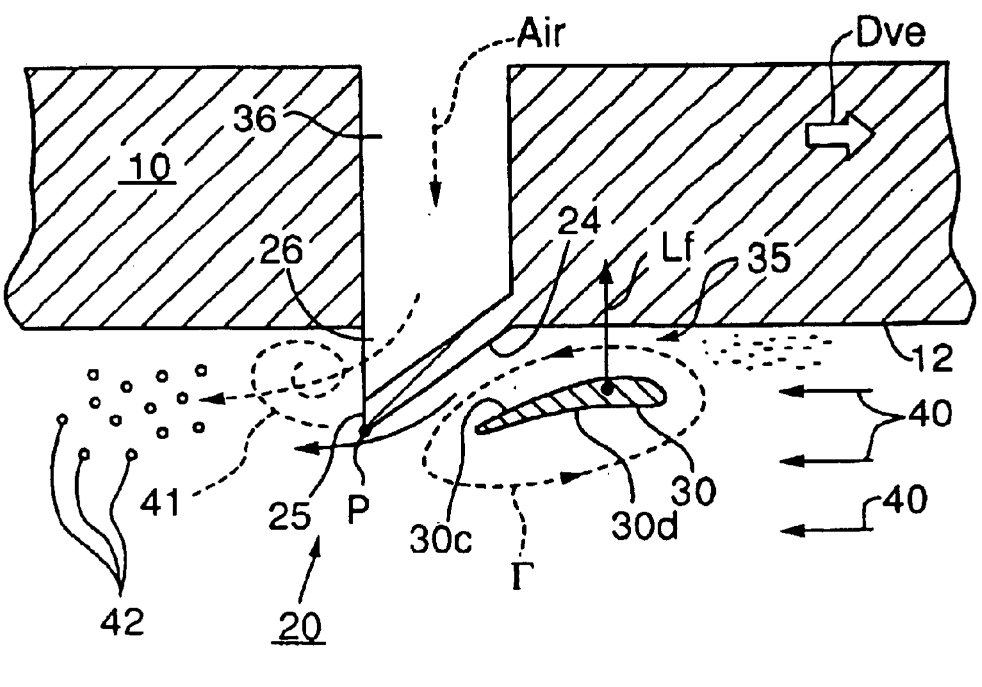
FIG. 22B is a second schematic diagram of a method of reducing the frictional resistance for a ship body in the fifth embodiment.

Although not shown in FIGS. 22A, 22B, similar circulating flow is generated on the second wings 31, 32 so that the amount of water flowing along the water passage 35 and the inclined surface 24 is further increased. That is, the circulating flow Γ generated around the wings 30, 31, 32 increases the flow velocity at the protrusion end P of the inclined surface 24 to generate a negative pressure region 41, and the suction force for drawing the bubbles 42 into the water is increased. Accordingly, numerous intervening bubbles 42 in the vicinity of the submerged surface 12 gather in the vicinity of the submerged surface 12 of the ship body 10 to lead to reduction in the frictional resistance. Also, circulating flow Γ is formed even during lowspeed operation (for example, about 10 knots), reduction effects of frictional resistance can be improved over a wide range of cruising speed.

Also, in this embodiment, a pressure differential is generated between the top/bottom surfaces of the first wing 30 due to the circulating flow around the first wing 30, and the lift force Lf acts on the ship body 10 by way of the first wing 30. Then, due to the lift force Lf, especially the bow section of the ship body 10 is lifted, and the submerged area of the ship body 10 is decreased to further reduce the frictional resistance of the ship body 10.

Further, for the formation of the negative pressure region 41, the shape of the flow guiding body 20 and the number of nozzles are the primary governing factors and the water depth has lesser influence so that the technology of this invention can be favorably adopted to bulk ships.

Here, the bubbles 42 mixed into the water are formed at a lower internal pressure than the static pressure existing at the water depth so that, when the bubbles 42 are moving through a constant water depth (for example, when the bubbles move along the bottom section of the ship body), increasing water pressure acts on the bubbles 42 as they move away from the negative pressure region 41 so that the size of the bubbles 42 is gradually reduced. According to the results of study by the present inventors, it has been found that smaller the size of the bubbles more effective is the friction reducing effect of the bubbles. Therefore, the bubbles generated by negative pressure region 41 are advantageous for reduction in frictional resistance from such a viewpoint also.

Also, because increasingly higher pressure is applied to the bubbles 42 as they move away from the negative pressure region 41, the bubbles 42 generated by the negative pressure effects tend less likely to disperse compared with the conventional compression method. Therefore, the bubbles 42 are relatively less likely to be detached from the submerged surface 12 so that the amount of bubbles 42 occupying specific regions near the bottom section of the ship body is increased. According to the results of study by the present inventors, the larger the volume of bubbles within the specific regions, more effective is the effect on frictional resistance, and the bubbles exert more effect if they occupy the region near the submerged surface 12. These facts indicate that the bubbles generated by the negative pressure effects are more advantageously effective for reducing the frictional resistance. Therefore, frictional resistance reduction effects can be further improved by disposing a plurality of flow guiding body 20 described above in accordance with the width of the bottom section of the ship body and ejecting the bubbles from several locations in the bottom section.

Also, the structure of the bubble generation apparatus 11 is simple and compressor for the air is not required so that it is obvious that the ship building cost of the ship body 10 is less.

Also, shapes and combination of components shown in this embodiment are only one example, and various variations within the scope of this invention is possible to meet design requirements and other performance demands. In the above embodiment, this invention is applied to a bulk ship but it is not limited to such an application, and it is applicable to other ship types such as highspeed ships. The size, number and location of the bubble generation apparatus 11 are chosen according to the shape of the ship.

F: Embodiment 6

Figure 23A:
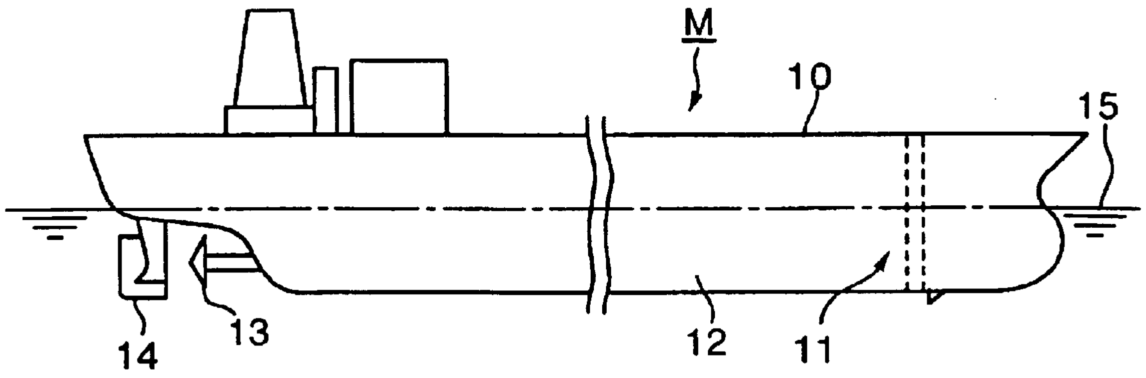
FIG. 23A is a schematic structural diagram of the friction reducing ship in a sixth embodiment.
Figure 23B:
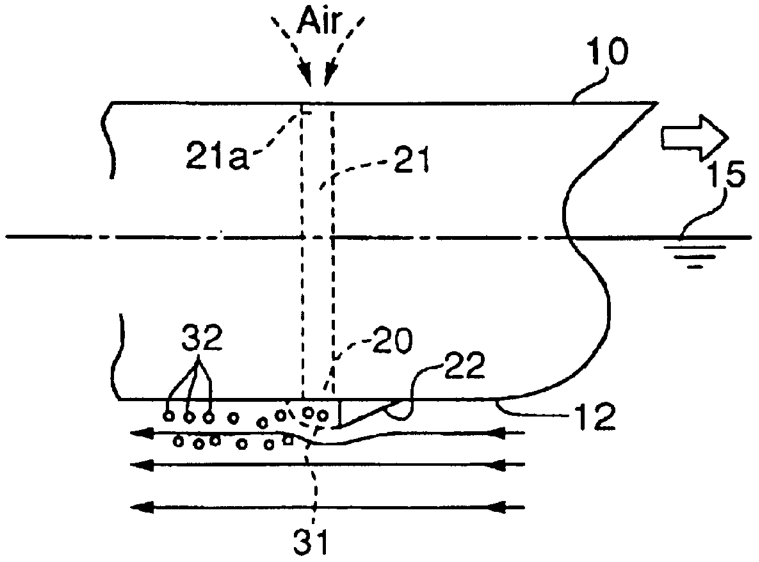
FIG. 23B is an enlarged view of the bubble generation apparatus 11 used in the ship shown in FIG. 23A.

In the following, an application of a friction reducing ship in Embodiment 6 to a bulk ships such as a tanker or container ship will be explained with reference to the drawings. In FIGS. 23A, 23B, M refers to a friction reducing ship, 10 to a ship body, 11 to a bubble generation apparatus, 12 to an external hull plate (submerged surface), 13 to a screw, 14 to a rudder, and 15 to a water surface (waterline). A bulk ship suitable for adopting as a friction reducing ship M is a VLCC (very large crude oil carrier) and the like, because the area of the bottom section in the external hull plate (submerged surface) 12 of the ship body 10 below the waterline 15 is made larger relative to the lateral hull of the ship body 10.

As shown in FIG. 23B, the bubble generation apparatus 11 is provided with a discharge opening 20 disposed in the submerged surface 12 (bottom section in this case); a fluid passage 21 one end of which is open to the gaseous space by way of the air intake opening 21*a* and the other end is open to the water by way of the discharge opening 20; and a negative pressure forming section 22 for forming a negative pressure region, which is under a lower pressure relative to the gaseous space (atmospheric), due to relative flow of water during cruising in the water near the discharge opening 20.

The negative pressure forming section 22, in this case, is disposed so as to protrude from the submerged surface 12 of the ship body, and changes the flow of water flowing along the submerged surface 12 of the ship body during cruising so as to form a negative pressure region in the water in rear of itself caused by phenomena such as stream separation, cavitation and lowering in static pressure accompanying an increase in flow velocity.

The friction reducing ship M of such a construction forms a negative pressure region 31 (refer to FIG. 23B) in the water, when it is in the cruising mode, so that the pressure at the air intake opening 21*a* of the fluid passage 21 facing the negative pressure region 31 is lowered, and the pressure gradient force is applied to the fluid in the fluid passage 21 and the air flowing from the air intake opening 21*a* is ejected into water from the discharge opening 20. Then, the gas delivered into the water becomes mixed in the water as air bubbles 32, and numerous intervening bubbles 32 in the vicinity of the submerged surface 12 gather in the vicinity of the submerged surface 12 of the ship body 10 to lead to reduction in the frictional resistance of the ship body 10.

Figure 24A:
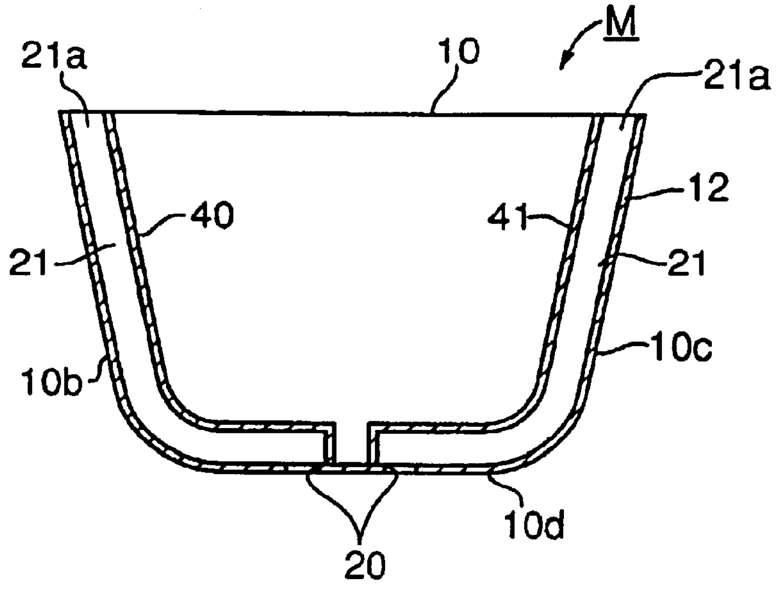
FIG. 24A is a cross sectional view as seen from the bow of the friction reducing ship in the sixth embodiment ship and represents a schematic diagram of the installation of ducting.
Figure 24B:
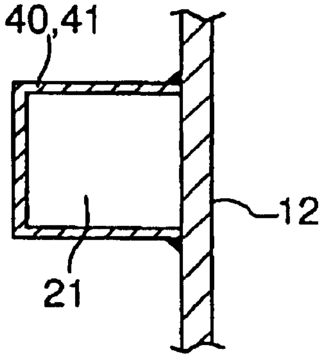
FIG. 24B is an enlarged cross sectional view of the duct in the friction reducing ship in the sixth embodiment.
Figure 24C:
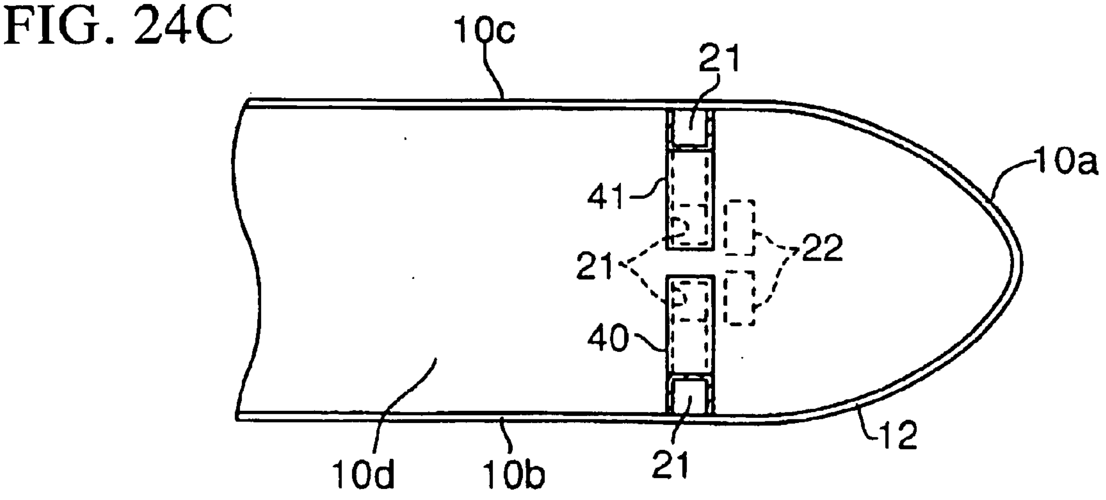
FIG. 24C is a plan view of duct installation seen from the deck surface near the bow of the friction reducing ship in the sixth embodiment.

However, in this friction reducing ship M, the fluid passage 21 is formed by the component members that constitute the outer shell of the ship body 10. Specifically, as shown in FIGS. 24A~24C, the fluid passage 21 is formed as the inner gaseous space of the ducts 40, 41 built along the external hull plate 12 extending from the deck area to the bottom section 10*d*. Ducts 40, 41 are used as a reinforcing members for reinforcing the ship body 10, in this case, the external hull plate 12.

FIG. 24B shows a cross sectional structure of the ducts 40, 41. That is, ducts 40, 41 are connected to the external hull plate 12 so as to form a fluid passage (fluid passage 21) having a specific cross sectional area. Here, it should be noted that, although ducts 40, 41 are formed as fluid passages having a rectangular cross section, but it is not limited such a shape, fluid passage having other shapes may be formed. The shape of the ducts 40, 41 and the shape of the fluid passage 21 serving as its inside space are determined on the basis of the shape and other data of the ship body 10 so as to enable to move the fluid at minimal pressure loss.

Also, FIG. 24C shows a plan view of installation of ducts 40, 41 as seen from above the ship. In this embodiment, a plurality of ducts 40, 41 are provided (two in this case) for port side 10*b* and the starboard side 10*c* of the ship, and, accordingly, the fluid passage 21 is also provided for left side as well as for the right side. The material for making the ducts 40, 41 includes preferably metals with some corrosion resistant treatment so that the surface is corrosion resistant mainly to seawater and resistant to attachment by marine organisms.

In the friction reducing ship M in this embodiment, the fluid passage 21 is formed by the ducts 40, 41 that comprise the outer shell of the ship body 10 so that there is no need to newly install piping for guiding a gas to the water, thereby enabling to reduce the labor required for making the components and ship building to readily reduce the cost of building the ship. Especially, the bubble generation apparatus 11 in this embodiment is based on forming a negative pressure region within the water and eject the air bubbles using the pressure gradient force so that, unlike the conventional method based on compressing apparatus, the present method offers advantages, such as no need for apparatus to compress the gas and uncomplicated structure of the facility, to enable to reduce the cost of building the ship.

Also, in this friction reducing ship M, ducts 40, 41 are installed along the outer hull plate 12 so that the inside space of the ship body 10 can be utilized very effectively. Further, in this embodiment, ducts 40, 41 are provided for the port side 10*b* as well as for the starboard side 10*c*, so that the fluid passage 21 is also divided, and therefore, each air intake opening 21*a* in a plurality of fluid passages 21 can be opened selectively to enable to readily adjust the amount of bubbles discharged into the water.

Figure 25:
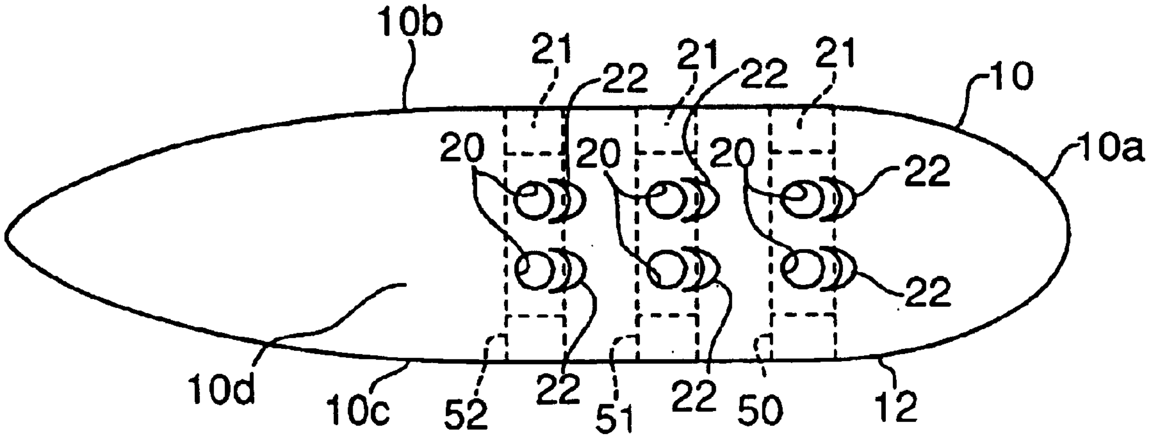
FIG. 25 is a plan view seen from the ship bottom surface of a variation of the friction reducing ship presented in the sixth embodiment.

FIG. 25 shows a variation of this embodiment.

In this variation, the fluid passage 51 is formed by ducts 50, 51, 52 disposed along the external hull plate 12 from the port side 10*b* to the starboard sides 10*c*. Also, a plurality of ducts 50, 51, 52 are disposed from the bow section 10*a* at the stern section of the ship with spaces in between, and a plurality of discharge openings 20 and the negative pressure forming sections 22 are provided on the bottom section 10*d* to correspond with the fluid passage 21 formed by the inner spaces of the ducts 50, 51, 52. Similar to the preceding embodiment, the ducts 50, 51, 52 are also reinforcing members to comprise the outer shell as well as to reinforce the ship body 10.

In this variation, because the fluid passage 21 is formed by the ducts 50, 51, 52 disposed from the port side 10*b* to the starboard side 10*c*, lesser restriction is placed on the location of the discharge opening 20 and the negative pressure forming section 22, thus enabling to locate the discharge opening 20 in any desired location along the width direction of the ship body 10. Moreover, because a plurality of fluid passages 21 are formed at a specific separation distance, it enables to provide separated discharge openings 21 in the longitudinal direction of the ship. That is, it becomes possible to dispose a plurality of discharge openings 20 on the bottom section 10*d* so as to distribute the bubbles over a wide area of the submerged surface to improve the effect of reducing the frictional resistance. In addition, the ducts 50, 51 that form the fluid passage 21 are reinforcing members of the ship body 10, and therefore, a high degree of design freedom is possible such as providing many ducts on the ship body 10 and disposing the ducts wherever needed. Furthermore, by providing a plurality of air spaces beforehand on the ship body to serve as the fluid passage 21, even after the completion of ship building, it is possible to provide discharge openings 21 as required for ejecting bubbles.

Also, shapes and combination of components shown in this embodiment are only one example, and various variations within the scope of this invention is possible to meet design requirements and other performance demands. In the above embodiment, this invention is applied to a bulk ship but it is not limited to such an application, and it is applicable to other ship types such as highspeed ships and fishing ships. The size, number and location of the bubble generation apparatus 11 are chosen according to the shape of the ship.

What is claimed is:

1. A method for reducing frictional resistance of a ship body by ejecting gas bubbles on a surface of the ship body submerged in water by creating in the water a negative pressure region having a pressure lower than a pressure in a gaseous space, resulting from the ship body cruising through a body of the water, directing a gas from the gaseous space to the negative pressure region in the water, and exerting inertial force on the gas bubbles at the negative region in a direction so as to detach the bubbles from a gas/liquid interface by providing the gas/liquid interface at a smoothly curved water passage, wherein the gas in the gaseous space is substantially at atmospheric pressure.

2. A friction reducing ship, that reduces frictional resistance by ejecting gas bubbles on a submerged surface of a ship body, comprising:

a negative pressure forming section for creating a negative pressure region in water having a lower pressure relative to a gaseous space;

a fluid guiding passage for directing a gas from the gaseous space to the negative pressure region; and a detaching promotion section for exerting inertial force on the gas bubbles at the negative region in a direction so as to detach the bubbles from a gas/liquid interface by providing the gas/liquid interface at a smoothly curved water passage, wherein the gas in the gaseous space is substantially at atmospheric pressure.

3. A friction reducing ship according to claim 2, wherein the negative pressure forming section is comprised by a wing protruding into the water from the submerged surface of the ship body; struts for supporting the wing; a flow guiding body disposed on a ship side of the wing.

4. A friction reducing ship according to claim 3, wherein the detaching promotion section is comprised by the wing on a side of the ship body so as to have a 凸-shape, and the flow guiding body formed so as to follow a shape of the wing.

5. A friction reducing ship, that reduces frictional resistance by ejecting gas bubbles on a submerged surface of a ship body, comprising:

a negative pressure forming section protruding from the submerged surface for creating a negative pressure region in a water relative to a gaseous space;

a detaching promotion section for exerting inertial force on the gas bubbles at the negative region in a direction so as to detach the bubbles from a gas/liquid interface by providing the gas/liquid interface at a smoothly curved water passage;

a discharge opening disposed in a rear of the negative pressure forming section for ejecting gas bubbles towards the negative pressure region in the water;

a mild passage having one end open to the gaseous space and having another end open in the water by way of the discharge opening so as to direct a gas from the gaseous space into the water; and a gas supply apparatus for supplying the gas towards the negative pressure region, wherein the gas in the gaseous space is substantially at atmospheric pressure.

6. A method for reducing frictional resistance by ejecting gas bubbles on a submerged surface of a ship body by creating in a water a negative pressure region having a pressure lower than the pressure in a gaseous space, resulting from the ship body cruising through a body of the water, exerting inertial force on the gas bubbles at the negative region in a direction so as to detach the bubbles from a gas/liquid interface by providing the gas/liquid interface at a smoothly curved water passage, directing a gas from the gaseous space to the negative pressure region in the water so as to eject the gas bubbles into the body of the water, and supplying the gas to the negative pressure region by using a gas supply apparatus, wherein the gas in the gaseous space is substantially at atmospheric pressure.

7. A method for reducing frictional resistance by ejecting gas bubbles on a submerged surface of a ship body by creating in a water a negative pressure region having a pressure lower than the pressure in a gaseous space, resulting from the ship body cruising through a body of the water, exerting inertial force on the gas bubbles at the negative region in a direction so as to detach the bubbles from a gas/liquid interface by providing the gas/liquid interface at a smoothly curved water passage, directing a gas from the gaseous space to the negative pressure region in the water, and generating a circulating flow of the water by using a wing to expand the negative pressure region, wherein the gas in the gaseous space is substantially at atmospheric pressure.

8. A friction reducing ship, that reduces frictional resistance by ejecting gas bubbles on a submerged surface of a ship body, comprising:

a negative pressure forming section protruding from the submerged surface for creating a negative pressure region in a water relative to a gaseous space;

a detaching promotion section for exerting inertial force on the gas bubbles at the negative region in a direction so as to detach the bubbles from a gas/liquid interface by providing the gas/liquid interface at a smoothly curved water passage;

a discharge opening disposed in a rear of the negative pressure forming section for ejecting the gas bubbles towards the negative pressure region in the water;

a fluid passage having one end open to the gaseous space and having other end open in the water by way of the discharge opening so as to direct a gas from the gaseous space into the water;

wherein the negative pressure forming section is provided with a wing shaped component whose cross sectional shape is formed in a wing shape; and wherein the gas in the gaseous space is substantially at atmospheric pressure.

9. A friction reducing ship according to claim 8, wherein the wing shaped component is disposed so as to generate an uplifting force.

* * * * *

UNITED STATES PATENT AND TRADEMARK OFFICE

CERTIFICATE OF CORRECTION

PATENT NO. : 6,789,491 B2
DATED : September 14, 2004
INVENTOR(S) : Yoshiaki Takahashi et al.

It is certified that error appears in the above-identified patent and that said Letters Patent is hereby corrected as shown below:

<u>Column 27,</u>
Line 8, after "a circulating flow", please delete "r", and insert therefor -- $\Gamma$ --.

<u>Column 31,</u>
Line 30, please delete "mild" and insert therefor -- fluid --.

Signed and Sealed this

Eighteenth Day of January, 2005

JON W. DUDAS
*Director of the United States Patent and Trademark Office*